United States Patent
Herrig et al.

(10) Patent No.: US 9,347,432 B2
(45) Date of Patent: May 24, 2016

(54) SYSTEM AND METHOD FOR ENHANCED OPERATION OF WIND PARKS

(71) Applicant: General Electric Company, Schenectady, NY (US)

(72) Inventors: Andreas Herrig, Bavaria (DE); Benoit Philippe Petitjean, Bavaria (DE); Sara Simonne Louisa Delport, Bavaria (DE); Nathan Charles Schneider, Mariettta, GA (US)

(73) Assignee: General Electric Company, Niskayuna, NY (US)

( * ) Notice: Subject to any disclaimer, the term of this patent is extended or adjusted under 35 U.S.C. 154(b) by 51 days.

(21) Appl. No.: 14/447,848

(22) Filed: Jul. 31, 2014

(65) Prior Publication Data

US 2016/0032893 A1 Feb. 4, 2016

(51) Int. Cl.
*A61F 11/06* (2006.01)
*G10K 11/16* (2006.01)
(Continued)

(52) U.S. Cl.
CPC ............. *F03D 7/048* (2013.01); *F03D 9/005* (2013.01); *H04R 1/1083* (2013.01); *H04R 2410/07* (2013.01)

(58) Field of Classification Search
CPC ......... G01H 3/14; H04N 11/00; H04R 29/00; H04R 3/005; H04R 1/10; H04R 1/28; H04R 1/1083; H04R 1/1091; H04R 5/033; H04R 2400/01; H04R 2410/00; H04R 2410/01; H04R 2410/05; H04R 2410/07; H04R 2460/01; H04R 25/00; H04R 25/75; H04S 7/40; F03D 7/048; F03D 9/005; A61F 11/06; G10K 11/175; G10K 11/178; G10K 2210/1081; G10K 2210/3048; G10K 2210/3055

USPC ........... 381/56, 41, 42, 43, 46, 71.1, 71.6, 72, 381/73.1, 74, 94.1, 370
See application file for complete search history.

(56) References Cited

U.S. PATENT DOCUMENTS 6,688,841 B1 * 2/2004 Wobben ................ F03D 7/0224
   415/1
7,988,414 B2 * 8/2011 Benito .................. F03D 7/0224
   416/33

(Continued)

FOREIGN PATENT DOCUMENTS

CN    202746093 U     2/2013
DE    WO 2013075959 A1 *  5/2013 ............. F03D 7/048
(Continued)

OTHER PUBLICATIONS

Herrig et al., "System and Method for Controlling the Operation of Wind Turbines", U.S. Appl. No. 14/447,765, filed Jul. 31, 2014, pp. 1-26.

(Continued)

*Primary Examiner* — Khai N Nguyen
(74) *Attorney, Agent, or Firm* — Ann M. Agosti

(57) ABSTRACT

A computer-implemented method of operating a wind turbine park including operating wind turbines includes recording a plurality of sound pressure measurements of the wind turbine park, thereby generating a sound recording. The method also includes calculating values for a plurality of acoustic features associated with the sound recording. The method further includes determining a relationship between the calculated values for the plurality of acoustic features and modeled acoustic features values resident within a probabilistic auditory model of the wind turbine park. The method also includes distinguishing a first contribution to the sound recording originating from the at least one operating wind turbine from a second contribution to the sound recording originating from non-wind turbine sources based on the determined relationship.

20 Claims, 12 Drawing Sheets

(51) Int. Cl.
*H03B 29/00* (2006.01)
*F03D 7/04* (2006.01)
*H04R 1/10* (2006.01)
*F03D 9/00* (2016.01)

(56) References Cited

U.S. PATENT DOCUMENTS

| | | | |
|---|---|---|---|
| 8,277,185 B2 | 10/2012 | Menke | |
| 8,304,926 B2 | 11/2012 | Attia | |
| 8,426,994 B2 * | 4/2013 | Nielsen | F03D 7/0296 290/44 |
| 2007/0031237 A1 * | 2/2007 | Bonnet | F03D 7/048 415/1 |
| 2007/0050441 A1 | 3/2007 | Taenzer et al. | |
| 2010/0098541 A1 * | 4/2010 | Benito | F03D 7/0224 416/36 |
| 2011/0223018 A1 * | 9/2011 | Srinivasan | F03D 7/0296 416/1 |
| 2013/0140818 A1 | 6/2013 | Matesanz Gil | |
| 2014/0193257 A1 * | 7/2014 | Ormel | F03D 7/0296 416/31 |
| 2014/0344209 A1 * | 11/2014 | Fang | G06N 7/005 706/52 |

FOREIGN PATENT DOCUMENTS

| | | | |
|---|---|---|---|
| DK | WO 2010037387 A2 * | 4/2010 | F03D 7/0296 |
| WO | 03064853 A1 | 8/2003 | |
| WO | 2010061255 A3 | 12/2010 | |
| WO | 2013023660 A1 | 2/2013 | |
| WO | WO 2013023660 A1 * | 2/2013 | F03D 7/0296 |
| WO | 2013075959 A1 | 5/2013 | |

OTHER PUBLICATIONS

Ambekar et al., "System and Method for Optimal Operation of Wind Farms", Application No. 3768/CHE/2014, filed Jul. 31, 2014, pp. 1-27.

Bourlis et al. "A wind speed estimation method using adaptive Kalman filtering for a variable speed stall regulated wind turbine", Probabilistic Methods Applied to Power Systems (PMAPS), 2010 IEEE 11th International Conference on, Jun. 14-17, 2010, pp. 89-94, Singapore.

* cited by examiner

SYSTEM AND METHOD FOR ENHANCED OPERATION OF WIND PARKS

BACKGROUND

The field of the disclosure relates generally to wind turbine generators and, more particularly, to a system and method for operation of wind turbine parks through enhanced acoustic measurements.

Most known wind turbine generators include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid have rotor blades having predetermined shapes and dimensions. The rotor blades transform mechanical wind energy into induced blade lift forces that further induce a mechanical rotational torque that drives one or more generators, subsequently generating electric power. A plurality of wind turbine generators in a localized geographic array is typically referred to as a wind farm or a wind park.

During operation of such known wind parks, rotational transiting of the rotor blades through air generates aerodynamic acoustic emissions, or noise. As a consequence, at least some of these known wind parks will receive noise receptor devices in the vicinity of the wind parks to measure the overall noise level. At least some of such measured acoustic noises have a decibel (dB) level that may approach local regulatory levels. To comply with the limits, at least some of the wind turbines may need to be put into a noise reduced operation (NRO) mode for a period of time. As such, the reduction of noise comes at the cost of annual energy production (AEP). Therefore, it is necessary to apply NROs that most efficiently reduce the noise levels for the least amount of time, and apply to the minimum number of turbines in the wind park to achieve the desired acoustic levels.

Known methods to achieve regulatory compliance include using far-field sound propagation models based on certain site parameters, e.g., turbine-receptor distances, ground absorption, wind shear, and thermal gradients together with a model of the turbine noise. However, conservative parameters may be selected that unnecessarily restrict production.

Another known method includes directly measuring the acoustic environment in the vicinity of the wind park and using feedback control to regulate the wind turbines in and out of NRO mode while taking into account time-dependent changes in the turbine noise level, e.g., air density, blade contamination state, wind shear, and the propagation characteristics. However, such measurement based control lacks features to discriminate whether the measured noise is actually originating from the wind turbines or is contaminated with, and possibly dominated by, ambient sounds. The latter condition typically results in a distorted sound pressure level (SPL) estimate, and the feedback control features would then attempt to reduce wind turbine noise through NRO even though the wind turbine noise levels are well within the established parameters. Therefore, feedback control setups (as well as processing certification measurements) need to include examinations of voluminous acoustic measurements to identify and discard acoustic records contaminated by extraneous noise contributions, e.g., cars, planes, and birds. These activities typically involve lengthy listening checks and manual removal of the contaminated segments. As such, the most severe noise outliers can be easily identified and discarded by inspecting the dB difference between the measured noise and the peak of the expected wind turbine noise curve, or the full curve if the wind speed/rpm is known. However, the SPL variations at large distances due to propagation effects introduce a substantial uncertainty when applying only this kind of filtering, thereby decreasing the usefulness of the data.

BRIEF DESCRIPTION

In one aspect, a computer-implemented method of operating a wind turbine park is provided. The method uses a computing device including at least one processor coupled to a memory device and the wind turbine park includes at least one operating wind turbine. The method includes recording a plurality of sound pressure measurements of the wind turbine park, thereby generating a sound recording. The method also includes calculating values for a plurality of acoustic features associated with the sound recording. The method further includes determining a relationship between the calculated values for the plurality of acoustic features and modeled acoustic features values resident within a probabilistic auditory model of the wind turbine park. The method also includes distinguishing a first contribution to the sound recording originating from the at least one operating wind turbine from a second contribution to the sound recording originating from non-wind turbine sources based on the determined relationship.

In a further aspect, a wind turbine park is provided. The wind turbine park includes a plurality of wind turbines including an operating wind turbine. The wind turbine park also includes a microphone positioned proximate the wind turbine park and a computing device coupled to the microphone. The computing device includes a processor and a memory device coupled to the processor. The computing device is configured to generate a sound recording through recording a plurality of sound pressure measurements of the wind turbine park through the microphone. The computing device is also configured to calculate values for a plurality of acoustic features associated with the sound recording. The computing device is further configured to determine, using the computing device, a relationship between the calculated values for the plurality of acoustic features from the sound recording with modeled acoustic features values resident within a probabilistic auditory model of the wind turbine park. The computing device is also configured to distinguish a first contribution to the sound recording originating from the operating wind turbine from a second contribution to the sound recording originating from non-wind turbine sources based on the determined relationship.

In another aspect, one or more computer-readable storage media having computer-executable instructions embodied thereon is provided. When executed by at least one processor, the computer-executable instructions cause the at least one processor to generate a sound recording through recording a plurality of sound pressure measurements of the wind turbine park. The computer-executable instructions also cause the at least one processor to calculate values for a plurality of acoustic features associated with the sound recording. The computer-executable instructions further cause the at least one processor to determine a relationship between the calculated values for the plurality of acoustic features with modeled acoustic features values resident within a probabilistic auditory model of the wind turbine park. The computer-executable instructions also cause the at least one processor to distinguish a first contribution to the sound recording originating from an operating wind turbine from a second contribution to the sound recording originating from non-wind turbine sources based on the determined relationship.

DRAWINGS

These and other features, aspects, and advantages of the present disclosure will become better understood when the following detailed description is read with reference to the accompanying drawings in which like characters represent like parts throughout the drawings, wherein.

Figure 1:
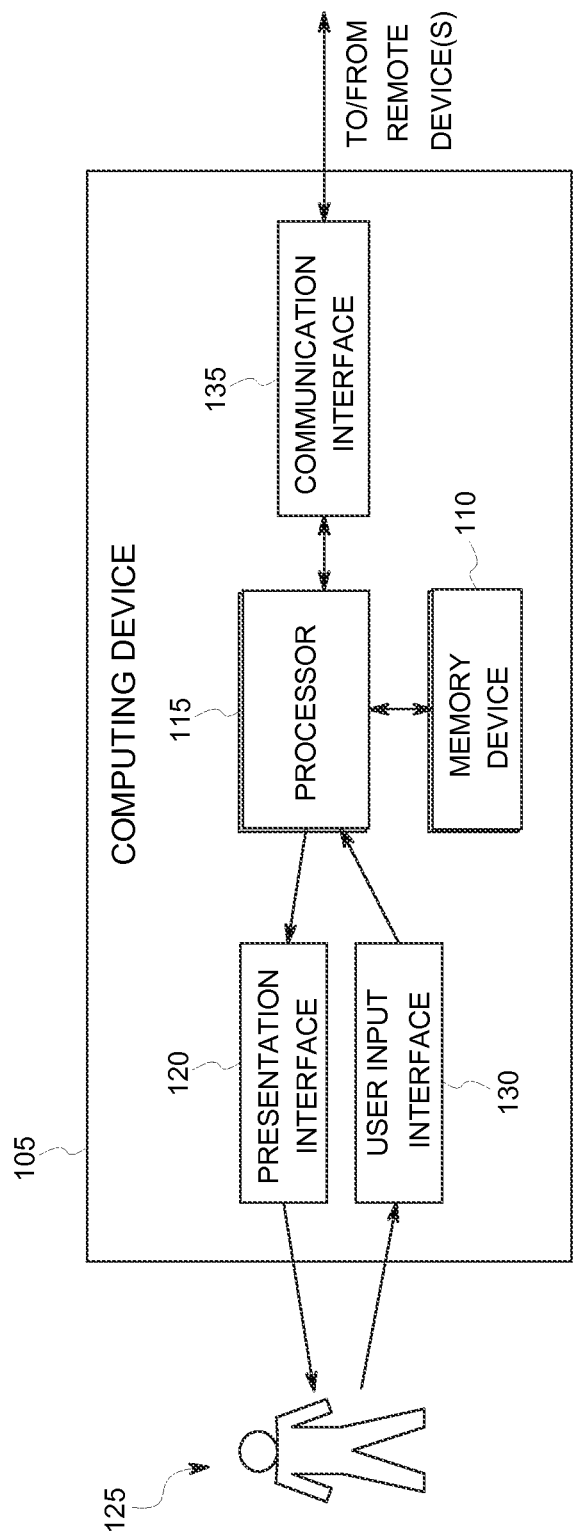
FIG. 1 is a block diagram of an exemplary computing device.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The wind turbine park control system described herein provides for using acoustic features of measured sound pressures of a wind turbine park to facilitate discriminating between noise emanating from wind turbines and noise emanating from other sources. Specifically, the systems and methods described herein use historical data to construct a probabilistic model for discriminating between wind turbine noise and non-wind turbine noise. The historical data includes segments of sound recordings of varying lengths that include the recorded sound pressures as a function of time. Some of the sound segments will include sound pressures that are substantially mostly wind turbine-generated noise, with only some small ambient non-wind turbine noise contamination, i.e., such sound segments are "substantially uncontaminated" (hereon, "uncontaminated" and "non-disturbed" will be used interchangeably). Alternatively, some of the sound segments will include sound pressures that include a significant level of ambient non-wind turbine noise contamination and are therefore substantially "contaminated" (hereon, "contaminated" and "disturbed" will be used interchangeably). As such, the systems and methods described herein are configured to facilitate enhanced discrimination between wind turbine noise and non-wind turbine noise through a constructed probabilistic model relating such noise feature changes to sound pressure. Such changes in sound pressure measurements may be changes to the overall noise level and shifts in the partial contributions between wind turbine noise and non-wind turbine noise while the changes in the overall noise level may be relatively constant. Therefore, the systems and methods described herein are configured to facilitate classification of the measured sound pressures contaminated and non-contaminated sound segments. More specifically, the systems and methods described herein are configured to model acoustic features associated with the wind turbine park and use the model to classify sound/noise recordings generated from measured sound pressures into non-contaminated and contaminated sound segments.

The sound segments indicative of time frames where the sound recordings are contaminated by extraneous non-wind turbine noise, i.e., time segments with a biased sound pressure level (SPL), are discarded, i.e., flagged as unacceptable. Extraneous non-wind turbine noise sources include, without limitation, contributions from cars, planes, and birds. Therefore, the overall recorded acoustic history of the wind farm will facilitate having the extraneous noise contributions not associated with wind turbine noise filtered out of subsequently analyzed sound recordings. As such, the filtering methods and algorithms described herein automatically differentiate between wind turbine noise and extraneous contributions.

In some alternative embodiments, the systems and methods described herein are optionally configured to correlate the changes in sound pressures, i.e., $\Delta$ sound pressures ($\Delta$dBs) to known sources and events using the constructed probabilistic model to leverage statistical estimates of the changes in sound pressures. Also, in some embodiments, rather than merely flagging the contaminated sound segments, the measured sound pressures can be corrected based on the estimated $\Delta$dBs generated through the modeled correlations. Such embodiments include the features necessary to generate continuous statistical estimates of $\Delta$ sound pressures, thereby facilitating obtaining more continuous feedback information in situations where long-term ambient noise contaminations, e.g., rain, vegetation noise, trains, vehicular traffic, and aircraft or nearly continuous short-term contaminations, e.g., insects and birds are present.

FIG. 1 is a block diagram of an exemplary computing device 105 that may be used to facilitate operation of a plurality of wind turbines (not shown in FIG. 1) through a wind turbine park control system (not shown in FIG. 1) at least partially resident within computing device 105. More specifically, computing device 105 generates models of acoustic features associated with a wind turbine park and uses the model to classify sound/noise recordings generated from measured sound pressures into non-contaminated and contaminated recorded sound segments. Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, historical sound pressures identified with wind turbine noise and non-wind turbine noise, sound/noise recordings and the associated acoustic feature values, and any other type data. Also, memory device 110 includes, without limitation, sufficient data, algorithms, and commands to facilitate generating models of acoustic features associated with a wind turbine park and uses the model to classify sound/noise recordings generated from measured sound pressures into non-contaminated and contaminated sounds for specific sound contamination sources, or to assess the $\Delta$ sound pressures induced by the ambient noise sources.

In some embodiments, computing device 105 also includes sufficient computer-readable/executable instructions, data structures, program modules, and program sub-modules, to receive other data associated with measured values from other wind turbine park and wind turbine systems to facilitate overall operation of the wind turbine park.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the wind turbine park control system being evaluated, such as by using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105. In some embodiments, communication interface 135 is a wireless interface.

Figure 2:
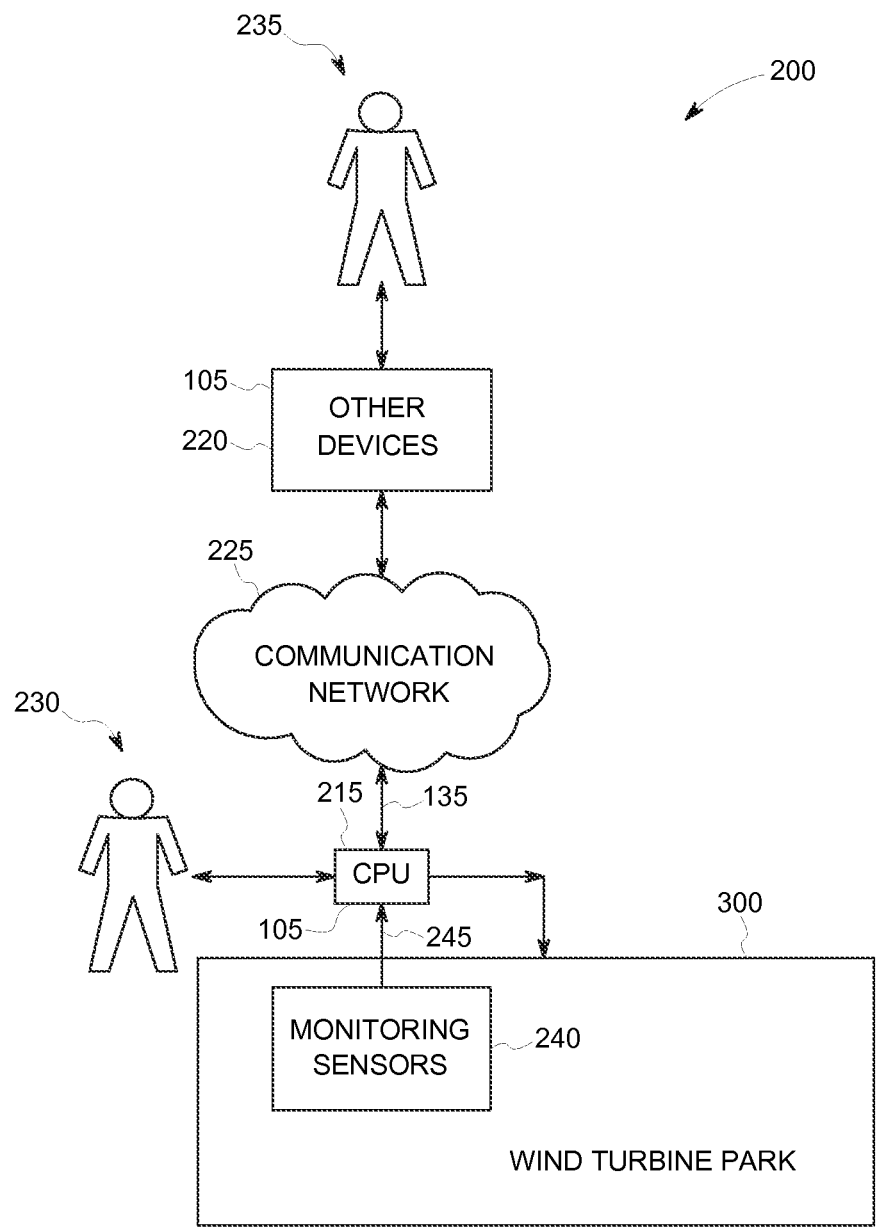
FIG. 2 is a block diagram of a portion of an exemplary wind turbine park control system that may include the computing device shown in FIG. 1.

FIG. 2 is a block diagram of a portion of a wind turbine park control system 200 that may be used to monitor and control at least a portion of a wind turbine park 300. In some embodiments, wind turbine park control system 200 also includes sufficient computer-readable/executable instructions, data structures, program modules, and program sub-modules, to receive other data associated with measured values from other wind turbine park and wind turbine systems to facilitate overall operation of wind turbine park 300. Alternatively, wind turbine park control system 200 is a stand-alone system. Further, alternatively, wind turbine park control system 200 is any computer-based system that may monitor portions of, and generate noise models for wind turbine park 300. In the exemplary embodiment, wind turbine park control system 200 includes at least one central processing unit (CPU) 215 configured to execute monitoring algorithms and monitoring logic. CPU 215 may be coupled to other devices 220 via a network 225. In some embodiments, network 225 is a wireless network.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about wind turbine park 300, such as measured sound pressures or SPLs, to operator 230. Other devices 220 interact with a second operator 235, e.g., without limitation, via user input interface 130 or presentation interface 120. For example, other devices 220 present alarms and/or other operational information to second operator 235. As used herein, the term "operator" includes any person in any capacity associated with operating and maintaining wind turbine park 300, including, without limitation, shift operations personnel, maintenance technicians, and facility supervisors.

In the exemplary embodiment, wind turbine park 300 includes one or more monitoring sensors 240 coupled to CPU 215 through at least one input channel 245. Monitoring sensors 240 collect operational measurements including, without limitation, sound pressures emanating from portions of wind turbine park 300. Monitoring sensors 240 may also collect other operational measurements including, without limitation, wind speeds and directions in portions of wind turbine park 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown).

Figure 3:
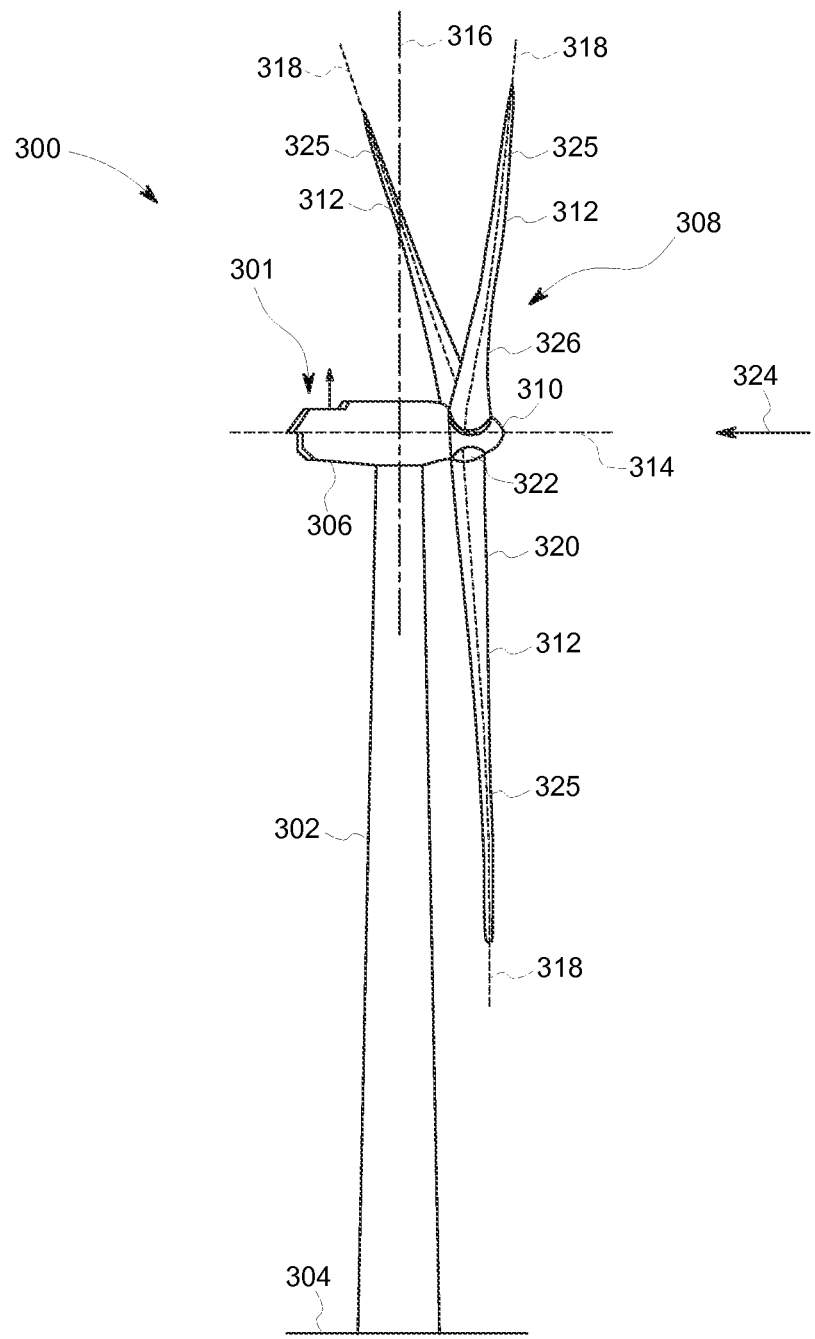
FIG. 3 is a schematic view of an exemplary wind turbine generator that may be used within a wind turbine park, both of which may be monitored and controlled through the wind turbine park control system shown in FIG. 2.

FIG. 3 is a schematic view of an exemplary wind turbine generator 301 that may be used within wind turbine park 300, both of which may be monitored and controlled through wind turbine park control system 200 (shown in FIG. 2). In the exemplary embodiment, wind turbine generator 301 is a horizontal axis wind turbine. Alternatively, wind turbine 301 may be a vertical axis wind turbine. Wind turbine 301 includes a tower 302 extending from a supporting surface 304, a nacelle 306 coupled to tower 302, and a rotor 308 coupled to nacelle 306. Rotor 308 has a rotatable hub 310 and a plurality of rotor blades 312 coupled to hub 310. In the exemplary embodiment, rotor 308 has three rotor blades 312. Alternatively, rotor 308 has any number of rotor blades 312 that enables wind turbine generator 301 to function as described herein. In the exemplary embodiment, tower 302 is fabricated from tubular steel and has a cavity (not shown in FIG. 3) extending between supporting surface 304 and nacelle 306. Alternatively, tower 302 is any tower that enables wind turbine generator 301 to function as described herein including, but not limited to, a lattice tower. The height of tower 302 is any value that enables wind turbine generator 301 to function as described herein.

Blades 312 are positioned about rotor hub 310 to facilitate rotating rotor 308, thereby transferring kinetic energy from wind 324 into usable mechanical energy, and subsequently, electrical energy. Rotor 308 and nacelle 306 are rotated about tower 302 on a yaw axis 316 to control the perspective of blades 312 with respect to the direction of wind 324. Blades 312 are mated to hub 310 by coupling a blade root portion 320 to hub 310 at a plurality of load transfer regions 322. Load transfer regions 322 have a hub load transfer region and a blade load transfer region (both not shown in FIG. 3). Loads induced in blades 312 are transferred to hub 310 via load transfer regions 322. Each of blades 312 also includes a blade tip portion 325.

In the exemplary embodiment, blades 312 have a length between 50 meters (m) (164 feet (ft)) and 100 m (328 ft), however these parameters form no limitations to the instant disclosure. Alternatively, blades 312 may have any length that enables wind turbine generator to function as described herein. As wind 324 strikes each of blades 312, blade lift forces (not shown) are induced on each of blades 312 and rotation of rotor 308 about rotation axis 314 is induced as blade tip portions 325 are accelerated. A pitch angle (not shown) of blades 312, i.e., an angle that determines each of blades' 312 perspective with respect to the direction of wind 324, may be changed by a pitch adjustment mechanism (not shown in FIG. 3). Specifically, increasing a pitch angle of blade 312 decreases a percentage of area 326 exposed to wind 324 and, conversely, decreasing a pitch angle of blade 312 increases a percentage of area 326 exposed to wind 324.

For example, a blade pitch angle of approximately 0 degrees (sometimes referred to as a "power position") exposes a significant percentage of a blade surface area 326 to wind 324, thereby resulting in inducement of a first value of lift forces on blade 312. Similarly, a blade pitch angle of approximately 90 degrees (sometimes referred to as a "feathered position") exposes a significantly lower percentage of blade surface area 326 to wind 324, thereby resulting in inducement of a second value of lift forces on blade 312. The first value of lift forces induced on blades 312 is greater than the second value of lift forces induced on blades 312 such that values of lift forces are directly proportional to blade surface area 326 exposed to wind 324. Therefore, values of lift forces induced on blades 312 are related to values of blade pitch angle.

Moreover, as speed of blade tip portion 325 increases, an amplitude (not shown) of acoustic emissions (not shown in FIG. 3) from blade 312 increases. Conversely, as speed of blade tip portion 325 decreases, an amplitude of acoustic emissions from blades 312 decreases. Therefore, the amplitude of acoustic emissions from blades 312 has a known relationship to a rotational speed of blade tip portions 325, typically increasing with a power of around 5/2 of the inflow velocity and the amplitude of acoustic emissions from blades 312 has a known relationship to blade pitch angle.

The pitch angles of blades 312 are adjusted about a pitch axis 318 for each of blades 312. In the exemplary embodiment, the pitch angles of blades 312 are controlled individually. Alternatively, blades' 312 pitch may be controlled as a group. Still further alternatively, the pitch of the blades, and the speed of the blades 312 may be modulated in order to reduce acoustic emissions. Preferably, wind turbine 301 may be controlled to reduce the potential acoustic emissions by a local controller (not shown), or remotely via a remote controller (not shown) to reduce noise. This noise reduction typically comes along with a reduction of the annual energy production (AEP), as for example a reduction of rotational speed at fixed torque directly reduces the power output.

Figure 4:
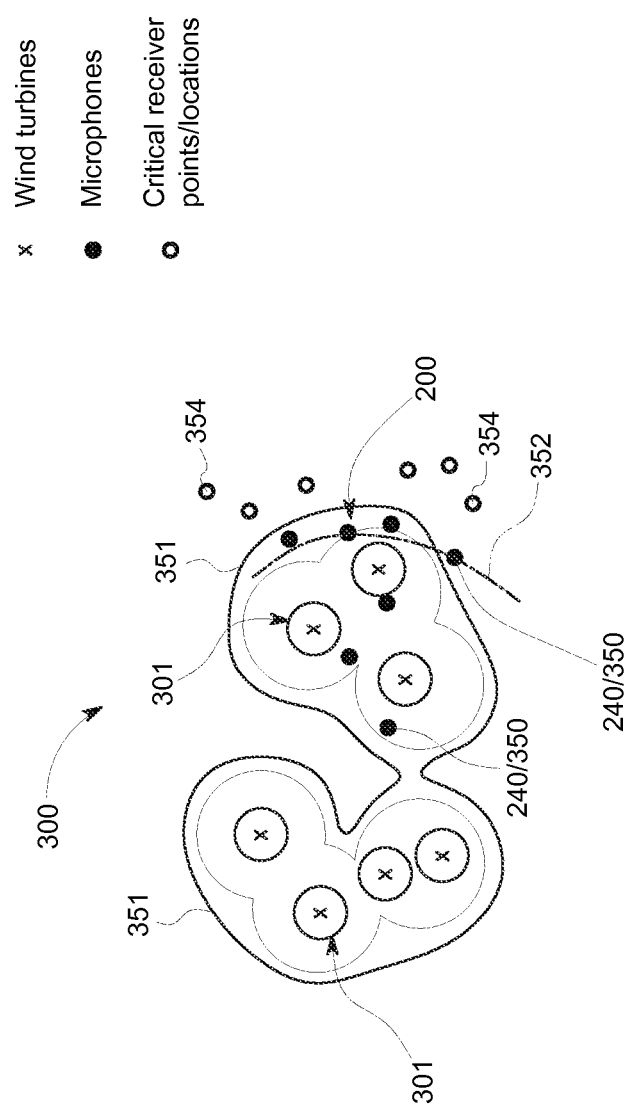
FIG. 4 is a schematic view of an exemplary wind turbine park that may include the wind turbine generator shown in FIG. 3.

FIG. 4 is a schematic view of wind turbine park 300 that includes a plurality of wind turbine generators 301. In the exemplary embodiment, wind turbine generators 301 are substantially similar to each other. Alternatively, the plurality of wind turbine generators includes units of various models. Further, alternatively, rather than a plurality of wind turbine generators 301, system 200 may be used with a wind turbine park 300 that includes only one wind turbine 301. Wind turbine park control system 200 includes a plurality of external sound measurement devices, or microphones 350 that are an example of monitoring sensors 240. Microphones 350 are positioned within park 300 at predetermined locations. System 200 includes any number of microphones 350 arrayed in any orientation that enables system 200 to function as described herein. Microphones 350 are coupled to CPU 215 (shown in FIG. 2) via input channel 245 (shown in FIG. 2) that includes, without limitation, input/output (I/O) conduits 204.

Microphones 350 generate electronic signals (not shown) that are substantially representative of acoustic emissions, or noise footprints (partially represented by iso-contours 351) emanating as combined noise contributions from the wind turbines as each of blades 112 rotates about axis 114 (both shown in FIG. 3). The electronic signals generated by microphones 350 also include contributions from ambient noises, i.e., extraneous non-wind turbine noise from sources including, without limitation, contributions from cars, planes, and birds. In the exemplary embodiment, microphones 350 generate and transmit signals (not shown) to CPU 215 that are substantially representative of broadband and/or narrowband features of the acoustic emissions emanating from each of blades 112 including, but not limited to, approximate frequency and amplitude values. The acoustic measurements are typically sound pressures typically measured in Pascals (Pa), which are converted to a logarithmic scale and measured in decibels (dBs).

In the exemplary embodiment, the acoustic measurements, i.e., the sound pressure measurements of wind turbine park 300 are recorded, thereby generating a sound recording with temporal features. The generated sound pressure measurements versus time relationship of the plurality of sound pressure measurements on the sound recordings at least partially generate a temporal sound pressure history. In some embodiments, such sound recordings are characterized as small chunks of sound signals that are transmitted through memory device 110 and are short-lived, i.e., rather than extended storage, subsequent to the acoustic feature data being extracted, such sound recordings are either deleted or overwritten shortly after the data extraction. The sound pressure measurements may include amplitude modulated waveforms having a carrier frequency component and a modulation envelope component. Additional data collected include, but are not limited to, electric power generation, loads, wind speed, and wind direction, all as a function of time.

In the exemplary embodiment, wind turbine park 300 includes a perimeter 352 and microphones 350 are positioned within perimeter 352, on perimeter 352, and outside of perimeter 352. Alternatively, any combination of such positioning with respect to perimeter 352 and wind turbines 301 is used. In some embodiments, some of wind turbine blades 312 of some wind turbines 301 may come into such an alignment with microphones 350 that facilitates taking advantage of a more pronounced Doppler-shift of noise generated by blades 312 when the Doppler effect is strong, i.e., when microphone 350 is proximate the rotor plane. Other blades 312 on other wind turbines 301 may not have such an alignment with any of microphones 350. Therefore, determining which wind turbine 301 is contributing to the overall noise level is facilitated. Since such analysis is yaw direction dependent, such microphones 350 will be limited with respect to collecting information with respect to the Doppler-shifts of the blade tones. Those tones not affected by Doppler shifts can be attributed to machine noise, and such tones may be matched to the expected meshing frequencies associated with the rpm of rotor 308 (shown in FIG. 3). Other recorded tones are then likely ambient noise. As the Doppler-shift effect is yaw direction dependent, i.e., dependent on rotor 308 with respect to yaw axis 316 (shown in FIG. 3), it will not always be applicable. But the positioning of microphone 350 can be adapted to a preferred direction. In some embodiments, microphone 350 is wireless and configured for one of one-directional communication and bi-directional communication.

Wind turbine park 300 also includes a plurality of critical receiver points (locations) 354. Such critical receiver points 354 are associated with locations where the overall noise levels from wind turbine farm 300 must meet regulatory requirements.

Figure 5:
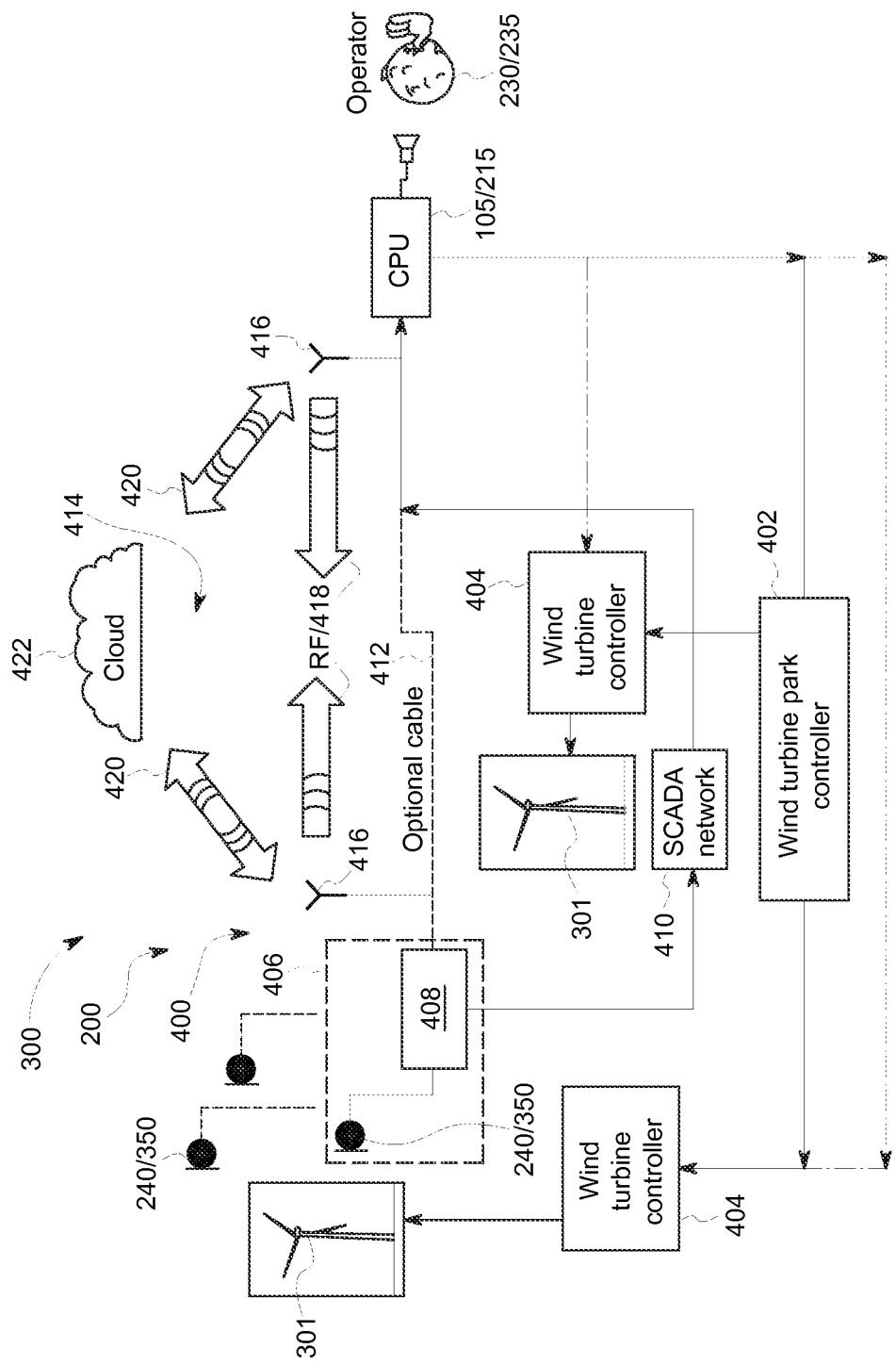
FIG. 5 is a schematic view of an exemplary wind turbine park noise monitoring and control system that may be used with the wind turbine park control system shown in FIG. 2.

FIG. 5 is a schematic view of an exemplary wind turbine park noise monitoring and control system 400 that may be used with wind turbine park control system 200. In the exemplary embodiment, system 400 includes microphones 350 positioned proximate wind turbines 301 within wind turbine farm 300 as described above. System 400 is a portion of wind turbine park control system 200. Alternatively, wind turbine park noise monitoring and control system 400 is a portion of any other system or systems regardless of the architecture of wind turbine park control system 200.

Also, in the exemplary embodiment, wind turbine park control system 200 includes a wind turbine park controller 402 and a plurality of wind turbine controllers 404 coupled to park controller 402. Park controller 402 primarily controls each of wind turbines 301 through wind turbine controllers 404, e.g., without limitation, regulating the rotation rate (revolutions per minute, i.e., rpm) and pitch angles of blades 312 about pitch axis 318 (both shown in FIG. 3) as a function of regulation of overall noise levels for wind turbine park 300 based on analyses by CPU 215. In some embodiments, wind turbine park control system 200 does not include wind turbine park controller 402 and communicates directly with wind turbine controllers 404.

Further, in the exemplary embodiment, each microphone 350 is a portion of a microphone station 406 that also includes a microphone controller 408 coupled to microphone 350. Microphone controller 408 channels the sound pressure measurements made by microphone 350 to CPU 215 for the analyses described below. In the exemplary embodiment, microphone station 406 includes at least a portion of computing device 105 (shown in FIG. 1), e.g., memory device 110 and processor 115 (both shown in FIG. 1). Such microphone stations 406 are configured to execute at least a portion of the methods described herein, including, without limitation, processing time signals to obtain the sound pressure measurements versus time relationship. Also, in some embodiments, microphone station 406 is configured to perform at least noise filtering through estimating changes in the recorded noise data, e.g., and without limitation, estimating noise ΔdB values and classifying the noise segment into one of "good" and "bad". The partially processed data is transmitted to CPU 215. Such methods are described in more detail below. In some other embodiments, microphone 350 merely records the SLP measurements and transmits the raw data to CPU 215, e.g., and without limitation, a conventional microphone 350 with a pre-amplifier (not shown) in the microphone station 406 coupled through cable to data acquisition equipment (not shown) associated with CPU 215.

Moreover, in the exemplary embodiment, microphone stations 406 are coupled to CPU 215 through a supervisory control and data acquisition (SCADA) network 410. SCADA network 410 facilitates transmitting other wind turbine and wind park related data to CPU 215. Alternatively, or in addition to SCADA network 410, microphone stations 406 are coupled to CPU 215 through a data transmission cable 412. Also, alternatively, or in addition to SCADA network 410 and cable 412, microphone stations 406 are coupled to CPU 215 through a wireless data transmission network 414 that includes a plurality of antennas 416 that facilitate one, or both of, radio frequency (RF) communications 418 and Internet communications 420, including through a cloud 422. In some embodiments, these methods can include, without limitation, proprietary RF communication protocols with special transmitters/receivers, on standard bands, wireless local area network (WLAN) communication, or communication through a general packet radio service (GPRS)/3G cell phone network.

In the exemplary embodiment, CPU 215 receives the sound pressure measurements, and any partially processed data therefrom, from all of microphone stations 406. CPU 215 also determines the contribution to the total sound pressure measurements that is noise from wind turbines 301 by using a probabilistic model including acoustic features for filtering the noise that is not caused by wind turbine 301. Using acoustic features facilitates better discrimination between noise sources and to facilitate building a correlation (when gathering historical data) between feature changes and the measured sound pressures so that noise signals are more precisely corrected.

CPU 215 further executes at least a portion of the methods described herein, including, without limitation, processing time signals to obtain the sound pressure measurements versus time relationship. Further, in some embodiments, CPU 215 performs at least some noise filtering through estimating changes in the recorded noise data, e.g., and without limitation, estimating noise ΔdB values and classifying the noise segment into one of "good" and "bad". Such methods are described in more detail below. Moreover, CPU 215 calculates operational values for noise reduced operation (NRO) mode for at least some of wind turbines 301 in wind turbine farm 300 that reduces noise while mitigating decreases in annual energy production (AEP).

Figure 6:
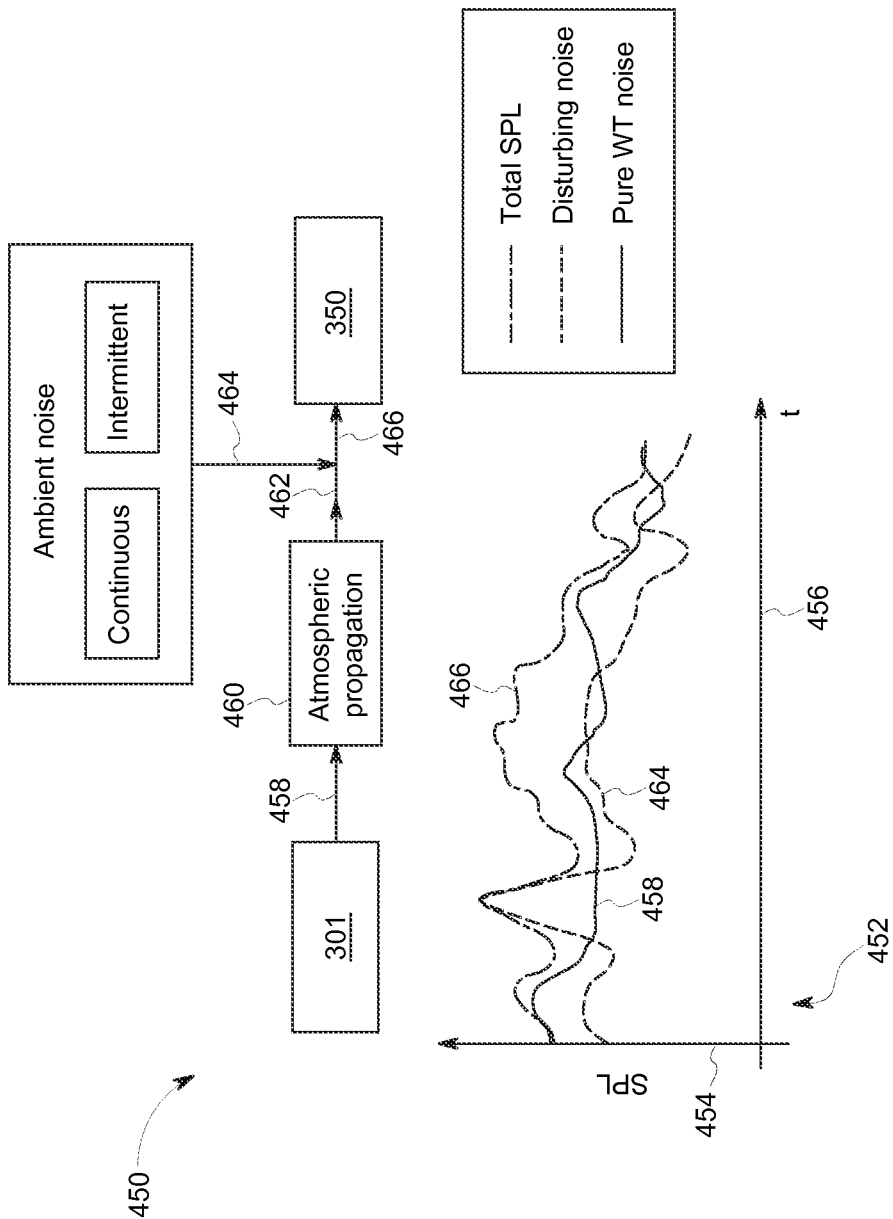
FIG. 6 is an exemplary view of changes in noise levels that maybe associated with the wind turbine park shown in FIG. 4.

FIG. 6 is an exemplary view of changes in noise levels that may be associated with the wind turbine park 300 (shown in FIG. 4). FIG. 6 includes a simple diagram 450 of noise collection from wind turbine generators 301 as collected by microphones 350. FIG. 6 also includes an associated graph 452 of sound pressure level (SPL) versus time, where a unitless y-axis 454 represents the sound pressure measurements of the noise (on a logarithmic SPL scale in dB) and a unitless x-axis 456 represents time. Wind turbine generators 301 emit wind turbine noise 458 as described above which is transmitted through atmospheric propagation 460 to change to propagated wind turbine noise 462, which is turbine noise 458 with propagation variations. During propagation 460, ambient noise 464, both continuous (e.g., rain, wild life and wind) and intermittent (e.g., planes and cars), and sometimes referred to as disturbing noise, are added to generate a total sound pressure measurement 466. In general, ambient noise disturbances may be significant. As such, wind turbine park noise monitoring and control system 400 determines acoustic features to classify the portions of the total SPL to history in disturbed and non-disturbed noise, determine changes in the total SPL due to source change, propagation change, and changes to the ambient noise contribution, and to a ΔSPL value and, optionally, facilitate determining various kinds of disturbance sources through correlation to feature value changes, which helps improve the ΔSPL value. Furthermore, it can be detected, whether excessive amplitude modulation occurs and the associated reductions in acceptable SPL can be used as another input for the turbine noise control. The models may be derived by site-specific training, in some embodiments, it is possible to transport the model from one site to another and in some embodiments, a synthetically-generated database of features and correlations is used.

Figure 7:
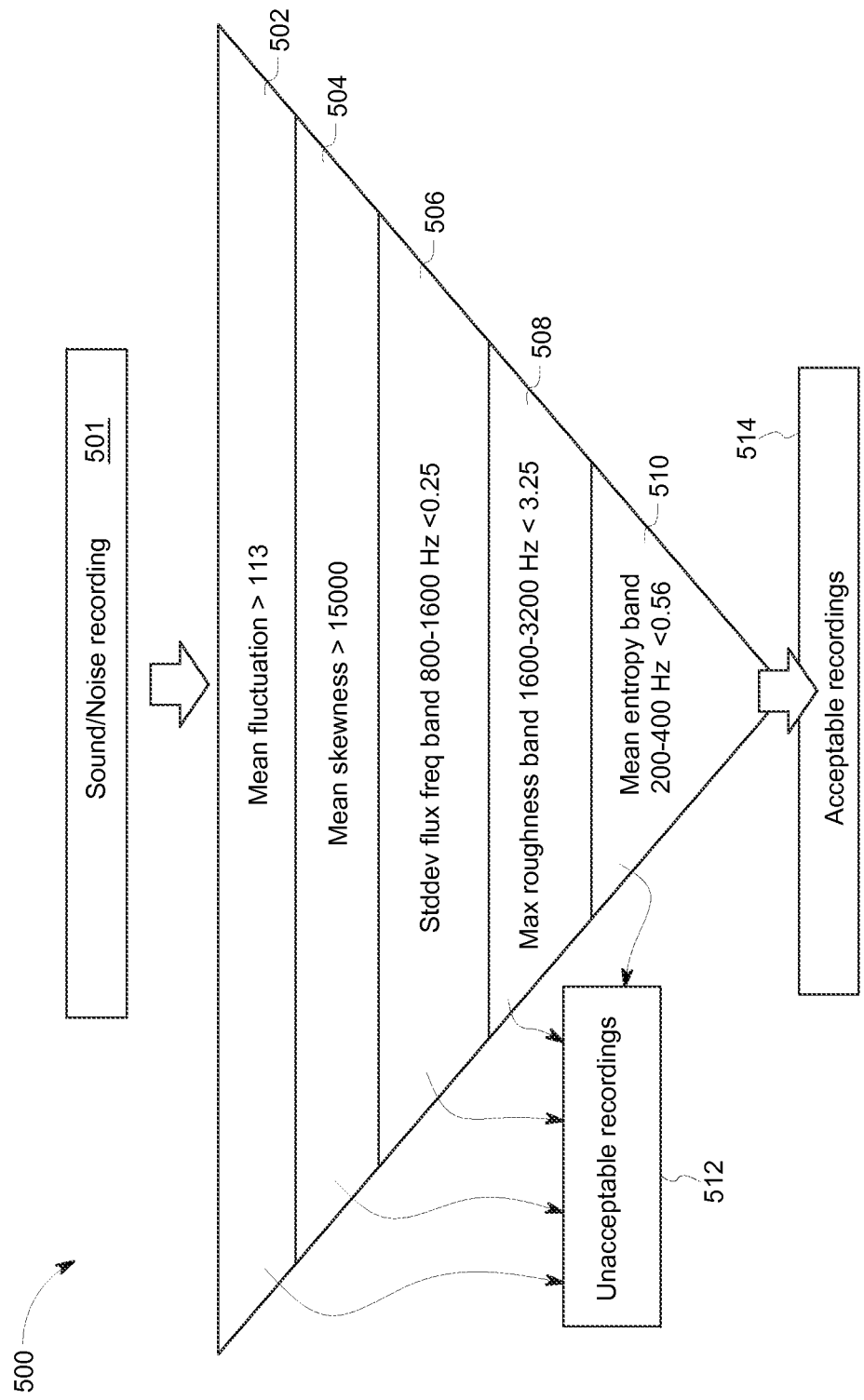
FIG. 7 is an exemplary view of a probabilistic auditory model for determining acceptable recordings and unacceptable recordings using the wind turbine park noise monitoring and control system shown in FIG. 5.

FIG. 7 is an exemplary view of a probabilistic auditory model, e.g., and without limitation, a decision tree model 500 for determining acceptable recordings and unacceptable recordings using wind turbine park noise monitoring and control system 400 (shown in FIG. 5). Decision tree model 500 determines the acceptability and unacceptability of the sound recordings through a series of filtering steps. As such, decision tree model 500 is shown as an inverted triangle where the unacceptable recordings (too much non-turbine noise) and acceptable recordings are distinguished from each other through basically a threshold "yes/no" analysis.

Figure 8:
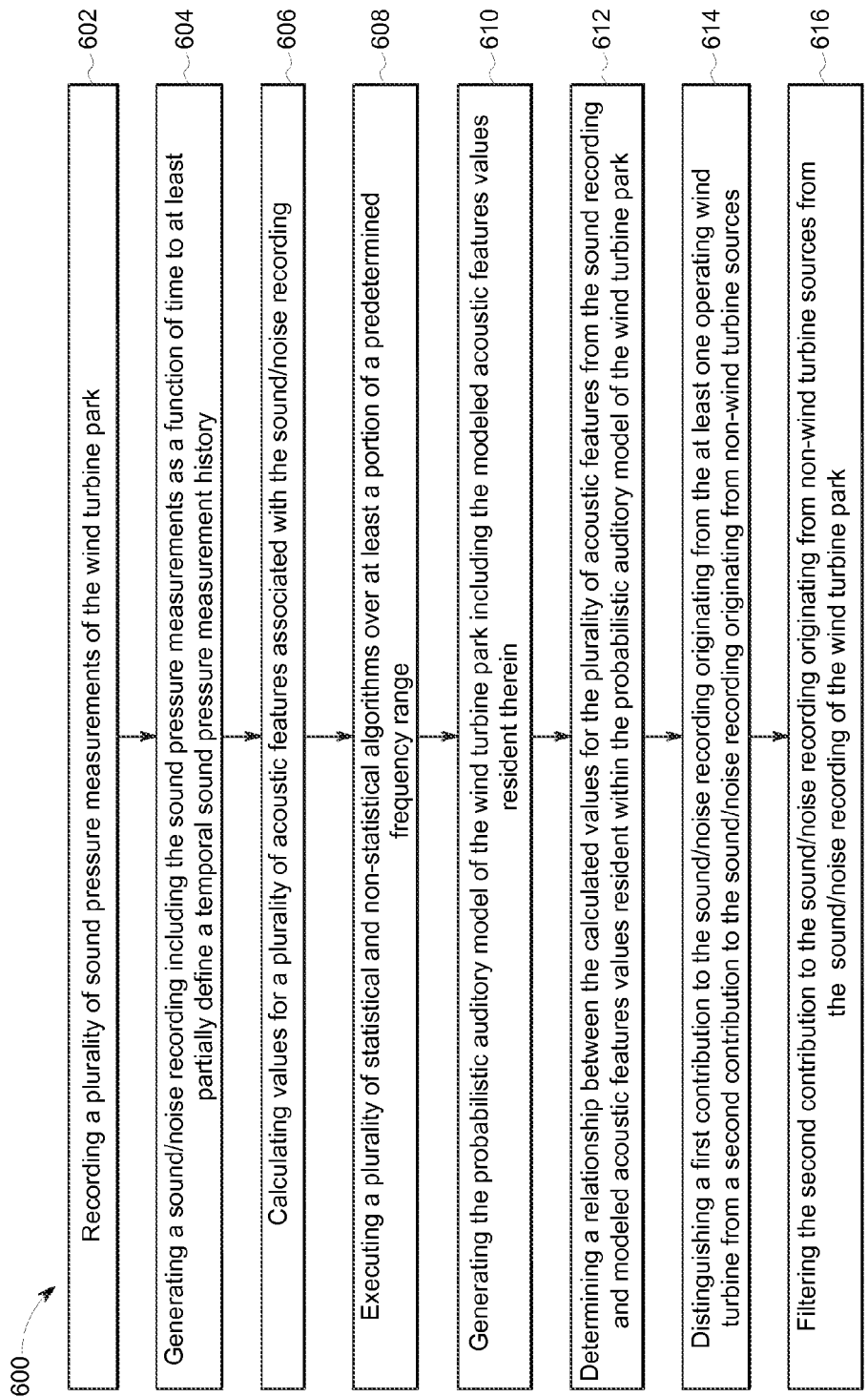
FIG. 8 is a flow chart of an exemplary method to operate the wind turbine park shown in FIG. 3 using the wind turbine park noise monitoring and control system shown in FIG. 5.

FIG. 8 is a flow chart of an exemplary method 600 to operate wind turbine park 300 (shown in FIG. 3) using wind turbine park noise monitoring and control system 400 (shown in FIG. 5). Referring to FIGS. 7 and 8, in the exemplary embodiment, a plurality of sound pressure measurements of wind turbine park 300 are recorded 602, thereby generating 604 a plurality of sound recordings. Specifically, the acoustic measurements, i.e., the sound pressure measurements of wind turbine park 300 are recorded, thereby generating a sound recording with temporal features, i.e., generating a sound pressure measurement versus time relationship of the plurality of sound pressure measurements. The temporal features are facilitated through either microphone stations 406 (shown in FIG. 5) or CPU 215. The generated sound pressure measurements versus time relationship of the plurality of sound pressure measurements on the sound recordings at least partially generate a temporal sound pressure history. The sound pressure measurements include amplitude modulated waveforms having a carrier frequency component and a modulation envelope component. As such, total sound pressure measurement 466 is generated by, or transmitted to, CPU 215 (shown in FIG. 5) through any architecture that enables operation of system 400 as described herein. Total sound pressure measurement 466 is recorded to generate at least one sound/noise recording 501 that is analyzed through decision tree model 500.

Also, in the exemplary embodiment, values for a plurality of acoustic features associated with sound/noise recording 501 are calculated 606. As such, a plurality of statistical and non-statistical algorithms over at least a portion of a predetermined frequency range are executed 608. Examples of non-statistical acoustic quantities include, without limitation, level weighting, where frequencies or times of certain portions of the determined spectra are more heavily weighted than others, and where the determined spectra are either defined in octave bands or $1/n^{th}$, e.g., 1/3 octave bands or narrow band spectra, with their respective power and spectral densities. The statistical algorithms include fluctuation analyses, skewness analyses, standard deviation of the flux frequency band, roughness analyses, and entropy analyses. In addition, any statistical analyses that enable operation of system 400 and decision tree model 500 as described herein are used including, without limitation, kurtosis, zero crossing rate, cepstrum (inverse Fourier transform of logarithmic spectrum), mel-frequency cepstral coefficients (MFCCs), and brightness.

The processing of sound/noise recordings 501 occurs in blocks of time segments of varying length, i.e., and without limitation, between approximately 10 milliseconds (ms) and up to several hours, in order to capture the different characters of ambient noise. For example a train pass-by takes much longer than a gun shot and airplane fly-overs include much lower frequencies than insect chirping. Ideally, the selection of acoustic features for the analyses facilitates specific determination of different disturbance sources.

Further, in the exemplary embodiment, the probabilistic auditory model, e.g., and without limitation, decision tree model 500 of wind turbine park 300, including the modeled acoustic features' values resident therein, is generated 610. To facilitate discrimination between wind turbine noise and non-wind turbine noise within total sound pressure measurements 466, the acoustic features of sound/noise recordings 501 are used to construct a probabilistic model, e.g., and without limitation, decision tree model 500 relating such features' changes to changes in total SPL to allow a classification into disturbed (non-wind turbine noise) sound segments and non-disturbed (wind turbine noise) sound segments. As such, the temporal sound pressure history including the sound recordings of the sound pressure measurements as a function of time includes amplitude modulated waveforms having a carrier frequency component and a modulation envelope component, where executing 608 the plurality of statistical and non-statistical algorithms as described above and further below includes analyzing at least one of the carrier frequency component and the modulation envelope component, the carrier frequency component being either filtered or non-filtered.

Moreover, in the exemplary embodiment, the probabilistic auditory model 500 of wind turbine park 300 includes one or more detection algorithms that are programmed into, i.e., implemented within, CPU 215. CPU 215 is configured to execute the detection algorithms within model 500 such that a first contribution to the wind park noise associated with at least one operating wind turbine 301 and a second contribution to the wind park noise associated with non-wind turbine sources are distinguished therein. The detection algorithms that at least partially define model 500 are trained based on measured noise data from wind turbine park 300 or with measured noise data from a generic site. Also, the training periods may include a single cycle of recording-analysis-training or may include a plurality of cycles to capture, without limitation, seasonal weather effects and changes in physical and operational aspects of wind turbines 301, park 300, and system 400. Regardless of the source of the measured noise data, the training cycle of model 500 includes estimating values of the difference in total sound pressure measurements (Δ sound pressures) related to non-turbine sources.

In some embodiments, additional data, e.g., and without limitation, rotor speed, wind speed, and pitch angle, either directly measured or calculated/estimated, are also input to model 500 to capture specific conditions that may be associated with changes in the sound pressure measurements. As such, particular selections of acoustic features for the acoustic analyses facilitate improving the determination of changes in the spectral shapes due to multiple contributions, further increasing the independence of noise reduced turbine operation from other noise sources.

The additional data further facilitates distinguishing between a first contribution to the wind park noise associated with the operating wind turbines 301 and a second contribution to the wind park noise associated with non-wind turbine sources. The greater the difference between the acoustic characteristics in model 500 between wind turbine noise and non-wind turbine noise, the greater the assurance of distinguishing between wind turbine noise and non-wind turbine noise in subsequent sound recordings.

In addition, in the exemplary embodiment of model 500 and its training, the measured sound pressures in the segments of the sound recordings are captured in dB values to generate the library of historical data to construct probabilistic model 500 for discriminating between wind turbine noise and non-wind turbine noise. As described above, the historical data includes segments of sound recordings of varying lengths that include the recorded sound pressures as a function of time.

Some of the recorded sound segments will include sound pressure measurements with a substantial contribution from wind turbine-generated noise, and with only some contribution from ambient non-wind turbine noise contamination. Alternatively, some of the sound segments will include sound pressures that include a substantial contribution from ambient non-wind turbine noise contamination, including segments where the contaminating noise sources are louder than wind turbines 301. In the exemplary embodiment, model 500 includes those segments of sound recordings that are non-disturbed, i.e., mostly wind turbine noise and acceptable, and segments of sound recordings that include sufficient noise contamination from ambient sources to be classified as disturbed and unacceptable. These distinguishing sound segments are then used to define probabilistic model 500 through a plurality of statistical analyses. As such, while Δ sound pressures are calculated during the training of model 500, estimates of Δ sound pressures are determined during post-training, i.e., analysis of subsequent sound pressure measurements. In some embodiments, to further facilitate distinguishing the first contribution to the sound pressure measurements from the second contribution to the sound pressure measurements originating from non-wind turbine sources, noise originating from non-wind turbine sources are recorded over a plurality of temporal periods as described above for subsequent analysis.

Also, in the exemplary embodiment, probabilistic model 500, based on the distinguishing characteristics between non-disturbed and disturbed noise as a function of the selected acoustic features, is used for analyzing subsequent sound recording captured during operation of wind turbine farm 300. In the course of "running" the subsequent sound recordings through model 500 those sound segments indicative of time frames where the sound recordings are contaminated by extraneous non-wind turbine noise, i.e., time segments with a biased sound pressure, are discarded, i.e., flagged as unacceptable. Extraneous non-wind turbine noise sources include, without limitation, contributions from cars, planes, and birds. Therefore, the overall subsequently recorded acoustic data of wind farm 300 will have the extraneous noise contributions not associated with wind turbine noise filtered out through flagging of the affected noise time frames. As such, model 500 executes the filtering methods and algorithms described further below automatically to differentiate between wind turbine noise and estimated extraneous contributions to flag the subsequently recorded sound segments with those segments consisting of substantially wind turbine noise with contamination noise below a predetermined threshold.

In some embodiments of model 500, the contributions of the extraneous noise sources may be determined with confidence, or at least with estimated ΔdB values such that the noise sources are identified and the associated correlated sound segments may be easily flagged with the known contaminations, thereby accelerating the filtering process. Therefore, in these embodiments, training probabilistic auditory model 500 of wind turbine park 300 includes distinguishing the second contribution to the sound pressure measurements originating from non-wind turbine sources. As such, the contributions of the second contribution to the sound pressure measurements are calculated and compared to differences in total sound pressure measurements (Δ sound pressures) and statistical estimates of the Δ sound pressures for model 500 are generated.

Also, in some embodiments, rather than merely flagging disturbed sound segments, the subsequent sound pressure measurements are corrected for the estimated ΔdB values with confidence that removal of the known extraneous noise sources from the sound recordings provides more accurate dB values of wind turbines 301.

As such, regardless of whether the changes in the sound pressure measurements originate from known operations of wind turbines 301 or known ambient sources, distinguishing the second contribution to the sound pressure measurements originating from non-wind turbine sources includes relating changes in the calculated values for the plurality of acoustic features in model 500 to acoustic signatures associated with known noise sources resident within probabilistic auditory model 500 of wind turbine park 300.

In some embodiments, model 500 is continuously updated with new data established from analyzing the subsequent sound recordings. Such new data may be added to the temporal sound pressure history by filtering the second contribution to the sound pressure measurements through flagging portions of the temporal sound pressure history that includes those noise levels from ambient sources that exceed predetermined thresholds.

In the exemplary embodiment, the statistical algorithms include fluctuation analyses, skewness analyses, standard deviation analyses of the flux frequency band, roughness analyses, and entropy analyses. Each is discussed further below. Alternatively, any statistical analyses in any order that enable operation of system 400 and decision tree model 500 as described herein are used including, without limitation, kurtosis, zero crossing rate, cepstrum (inverse Fourier transform of logarithmic spectrum), mel-frequency cepstral coefficients (MFCCs), and brightness.

Model 500 includes a first filtering module, i.e., mean fluctuation module 502 that analyzes a first acoustic feature therein. Module 502 compares mean values of the fluctuations of the amplitudes of sound/noise recording 501 about at least one predetermined mean value of amplitude to those psychoacoustic model values of the fluctuation strength resident in model 500. In the exemplary embodiment, the mean fluctuations of the noise amplitudes within the entire frequency band are analyzed. In general, the features can also be evaluated in one or more predetermined frequency bands smaller than the entire frequency range. The frequency bands are each defined by a first, lower predetermined frequency value and a second, greater predetermined frequency value. Any frequency bands that enable operation of system 400 and model 500 as described herein are used.

For example, and without limitation, in some embodiments, the first and second frequencies are zero and positive infinity, respectively. In general, those frequency bands that facilitate distinguishing between turbine noise and non-turbine noise are selected as a function of, and without limitation, the type, model, and manufacturer of the wind turbine generators being analyzed. In some embodiments, determining the suitable frequency bands may require a first selection and some subsequent fine tuning for settling on a frequency band, or a plurality of frequency bands, for the analyses. For example, and without limitation, a lower frequency band, a high frequency band, and an intermediate frequency band are selected. In some embodiments, some of these frequency bands include a predetermined overlap. Also, for example, and without limitation, embedded frequency bands may be used, i.e., a broader frequency band includes one or more of narrower frequency bands embedded therein. One or more predetermined fluctuation thresholds are also selected, which for example can be a lower bound of 113 for the mean fluctuation.

Within module 502, a relationship is determined 612 between the calculated values for the first acoustic feature, i.e., fluctuations from the sound recording and the fluctuations modeled within probabilistic auditory model 500 of wind turbine park 300. Model 500 includes the values of the acoustic features most representative of non-disturbed noise, i.e., a first contribution to historical sound pressure measurements associated with wind turbines 301 in wind turbine farm 300.

If the relationship, i.e., comparison between the fluctuation values indicates that the second contribution to sound/noise recordings 501 originating from non-wind turbine sources have excessively contaminated, i.e., disturbed sound/noise recordings 501, a first contribution to sound/noise recordings 501 originating from wind turbines 301 are distinguished 614 from the second contribution to sound/noise recordings 501 originating from non-wind turbine sources. When the associated sound segment is found to be disturbed, the segment of the sound recording is flagged and will not proceed to the next module (discussed below). However, if the determined relationship indicates that the second contribution to sound/noise recordings 501 originating from non-wind turbine sources have not excessively contaminated, i.e., have not disturbed sound/noise recordings 501, the associated segment of the sound recording is transmitted to the next module (discussed below). As such, the contaminated segments of sound/noise recording 501 are filtered 616 from the non-contaminated portions of sound/noise recordings 501.

Model 500 also includes a second filtering module, i.e., skewness module 504 that analyzes a second acoustic feature therein. Module 504 compares values of the third central moment, i.e., mean skewness of the amplitudes of sound/noise recording 501 to those model values of the mean skewness magnitude resident in model 500. In the exemplary embodiment, the skewness of the noise amplitudes about a mean value of amplitude is representative of a symmetry, or asymmetry of the noise amplitude values about the predetermined mean value. A substantially symmetric distribution will have a skewness value of approximately zero. Within module 504, a relationship is determined 612 between the calculated values for the second acoustic feature, i.e., skewness from the sound recording and the skewness modeled within probabilistic auditory model 500 of wind turbine park 300. Model 500 includes the values of the acoustic features most representative of non-disturbed noise, i.e., a first contribution to historical sound pressure measurements associated with wind turbines 301 in wind turbine farm 300. In the exemplary embodiment, a predetermined mean skewness threshold limit value of approximately 15,000 is used. As such, any mean skewness values greater than approximately 15,000 indicate disturbed sound segments. Alternatively, any values of mean skewness threshold limit that enable operation of system 400 and decision tree model 500 as described herein are used.

If the relationship, i.e., comparison between the skewness values indicate that the second contribution to sound/noise recording 501 originating from non-wind turbine sources have excessively contaminated, i.e., a disturbed sound/noise recording 501, a first contribution to sound/noise recording 501 originating from wind turbines 301 is distinguished 614 from the second contribution to sound/noise recording 501 originating from non-wind turbine sources. When the associated sound segment is found to be disturbed, the segment of the sound recording is flagged and will not proceed to the next module (discussed below). However, if the determined relationship indicates that the second contribution to sound/noise recording 501 originating from non-wind turbine sources have not excessively contaminated, i.e., have not disturbed sound/noise recording 501, the associated segment of the sound recording is transmitted to the next module (discussed below). As such, the contaminated segments of sound/noise recording 501 are filtered 616 from the non-contaminated portions of sound/noise recording 501.

Model 500 further includes a third filtering module, i.e., standard deviation of spectral flux frequency module 506 that analyzes a third acoustic feature therein. Module 506 compares values of the standard deviation of the distances between the spectrum of successive frames of sound/noise recording 501 to those model values of the standard deviation of the distances between the spectrum of successive frames resident in model 500. In the exemplary embodiment, the distances between the spectrum of successive frames is representative of a rate of change of the spectrum of sound/noise recording 501 by comparing one frame against a previous frame. Large spectral changes indicate a disturbance. In the exemplary embodiment, the frequency band for the analysis is between approximately 800 Hz and approximately 1600 Hz. Alternatively, any frequency bands that enable operation of system 400 and model 500 as described herein are used. Within module 506, a relationship is determined 612 between the calculated values for the third acoustic feature, i.e., standard deviation of flux from the sound recording and the standard deviation of flux modeled within probabilistic auditory model 500 of wind turbine park 300. Model 500 includes the values of the acoustic features most representative of non-disturbed noise, i.e., a first contribution to historical sound pressure measurements associated with wind turbines 301 in wind turbine farm 300. In the exemplary embodiment, a predetermined standard deviation of flux value of less than approximately 0.25 is used. As such, any standard deviation of flux values less than approximately 0.25 indicate disturbed sound segments. Alternatively, any values of standard deviation of flux that enable operation of system 400 and decision tree model 500 as described herein are used.

If the relationship, i.e., comparison between the standard deviation of flux values indicate that the second contribution to sound/noise recording 501 originating from non-wind turbine sources have excessively contaminated, i.e., have disturbed sound/noise recording 501, a first contribution to sound/noise recording 501 originating from wind turbines 301 are distinguished 614 from the second contribution to the sound pressure measurements originating from non-wind turbine sources. When the associated sound segment is found to be disturbed, the segment of the sound recording is flagged and will not proceed to the next module (discussed below). However, if the determined relationship indicates that the second contribution to sound/noise recording 501 originating from non-wind turbine sources have not excessively contaminated, i.e., have not disturbed sound/noise recording 501, the associated segment of the sound recording is transmitted to the next module (discussed below). As such, the contaminated segments of sound/noise recording 501 are filtered 616 from the non-contaminated portions of sound/noise recording 501.

Model 500 also includes a fourth filtering module, i.e., a roughness module 508 that analyzes a fourth acoustic feature therein. Module 508 compares values of the roughness, i.e., sensory dissonance related to beating phenomena when pairs of sinusoid acoustic signals are close to each other in frequency, of sound/noise recording 501 to those model values of the roughness values resident in model 500. In the exemplary embodiment, the amplitude peaks in the predetermined frequency band are generated by different sound sources and if these amplitude peaks are large enough and exhibit constructive interference or a resonance, they may have a significant impact on sound/noise recording 501. Specifically, the dissonant beats may disturb the sound recordings. In the exemplary embodiment, the frequency band for the analysis is between approximately 1600 Hz and approximately 3200 Hz. Alternatively, any frequency bands that enable operation of system 400 and model 500 as described herein are used. Within module 508, a relationship is determined 612 between the calculated values for the fourth acoustic feature, i.e., roughness from sound/noise recording 501 and the roughness modeled within probabilistic auditory model 500 of wind turbine park 300. Model 500 includes the values of the acoustic features most representative of non-disturbed noise, i.e., a first contribution to historical sound pressure measurements associated with wind turbines 301 in wind turbine farm 300. In the exemplary embodiment, a predetermined maximum roughness value of less than approximately 3.25 is used. As such, any roughness values less than approximately 3.25 indicate disturbed sound segments. Alternatively, any values of roughness that enable operation of system 400 and decision tree model 500 as described herein are used.

If the relationship, i.e., comparison between the roughness values indicate that the second contribution to sound/noise recording 501 originating from non-wind turbine sources have excessively contaminated, i.e., have disturbed sound/noise recording 501, a first contribution to the sound/noise recording 501 originating from wind turbines 301 are distinguished 614 from the second contribution to the sound pressure measurements originating from non-wind turbine sources. When the associated sound segment is found to be disturbed, the segment of the sound recording is flagged and will not proceed to the next module (discussed below). However, if the determined relationship indicates that the second contribution to sound/noise recording 501 originating from non-wind turbine sources have not excessively contaminated, i.e., have not disturbed sound/noise recording 501, the associated segment of the sound recording is transmitted to the next module (discussed below). As such, the contaminated segments of sound/noise recording 501 are filtered 616 from the non-contaminated portions of sound/noise recording 501.

Model 500 also includes a fifth filtering module, i.e., an entropy module 510 that analyzes a fifth acoustic feature therein. Module 510 compares values of the mean entropy, i.e., randomness related to the frequency of recurring amplitude of substantially similar height magnitudes that may be indicative of a measureable noise from either a turbine or non-turbine source. This measureable noise may have a significant impact on sound/noise recording 501. In the exemplary embodiment, the frequency band for the analysis is between approximately 200 Hz and approximately 400 Hz. Alternatively, any frequency bands that enable operation of system 400 and model 500 as described herein are used. Within module 510, a relationship is determined 612 between the calculated values for the fifth acoustic feature, i.e., entropy from the sound recording and the entropy modeled within probabilistic auditory model 500 of wind turbine park 300. Model 500 includes the values of the acoustic features most representative of non-disturbed noise, i.e., a first contribution to historical sound pressure measurements associated with wind turbines 301 in wind turbine farm 300. In the exemplary embodiment, a predetermined entropy value of less than approximately 0.56 is used. As such, any entropy values less than approximately 0.56 indicate disturbed sound segments. Alternatively, any values of roughness that enable operation of system 400 and decision tree model 500 as described herein are used.

If the relationship, i.e., comparison between the entropy values indicate that the second contribution to sound/noise recording 501 originating from non-wind turbine sources have excessively contaminated, i.e., have disturbed sound/ noise recording 501, a first contribution to the sound/noise recording 501 originating from wind turbines 301 are distinguished 614 from the second contribution to the sound pressure measurements originating from non-wind turbine sources. When the associated sound segment is found to be disturbed, the segment of the sound recording is flagged and will not be saved. However, if the determined relationship indicates that the second contribution to sound/noise recording 501 originating from non-wind turbine sources have not excessively contaminated, i.e., have not disturbed sound/ noise recording 501, the associated segment of the sound recording is saved. As such, the contaminated segments of sound/noise recording 501 are filtered 616 from the non-contaminated portions of sound/noise recording 501.

As the disturbed recordings are flagged, they are transmitted to an unacceptable recordings queue 512. The non-disturbed recordings that are transmitted through model 500 and are not flagged are transmitted to an acceptable recordings queue 514. The unacceptable recordings in queue 512 may be completely discarded or may be stored in a separate library for future analysis. The acceptable recordings in queue 514 may be added to the library of historical sound pressure measurements, or sound/noise recordings for reinforcement of acceptable noise levels associated with the first contribution to the sound pressure measurements associated with wind turbines 301.

Under some circumstances, significant sound contaminations are present and a precise enough wind turbine noise estimate is not possible. CPU 215 is configured to either fall back to a default operating scheme or the sound at the receiver location can be extrapolated based on the time history of previous measurements. The previous measurements may be assisted by known changes of atmospheric conditions such as, without limitation, wind speed, direction, shear, and temperature. Also, recorded noise emissions measurements may be used as feedback signals for wind farm control optimization algorithms. Further, as an intermediate solution, the detection of the blade passing frequency (BPF) for rpm estimation and improvement of the recognition of wind turbine sound is possible, in particular for distinguishing similar low frequency disturbances like aircraft at large distance, based on zero padded fast Fourier transforms (FFTs) or autocorrelation of the signal itself, or its envelope. As such, abnormal amplitude modulation events, occurring at the BPF, might also be detectable.

Distinguishing the second contribution to the sound pressure measurements originating from non-wind turbine sources includes analyzing the total sound pressure measurements for a predetermined temporal period after generating the sound recording. Regarding the time scales of the estimation and reaction to changes, the algorithms within model 500 do not need to be very fast, as regulations may just require a fulfillment over a longer time period, e.g., multiple hours. A noise frame length of, e.g., without limitation, 10 seconds to 60 seconds facilitates deriving long-time averages of cleaned sound pressures. In addition, discrimination may be nearly real-time to facilitate real-time control of wind turbines 301 to control the overall noise levels of wind turbine park 300. Specifically, the first and second portions of the sound recordings may be distinguished from each other such that only the first contribution to the sound recordings associated with the noise from wind turbines 301 is retained and used for real-time control of wind turbines 301. During the training period of model 500, processing speed may be slower than once model 500 is trained. Once trained, model 500's speed is higher because no historical data is required for training and the processing resources can be primarily dedicated for analyzing subsequent sound recordings. In the exemplary embodiment, and without limitation, method steps 610 and 612 are used to train model 500 as part of the learning phase, as is typically used for probabilistic models.

Figure 9:
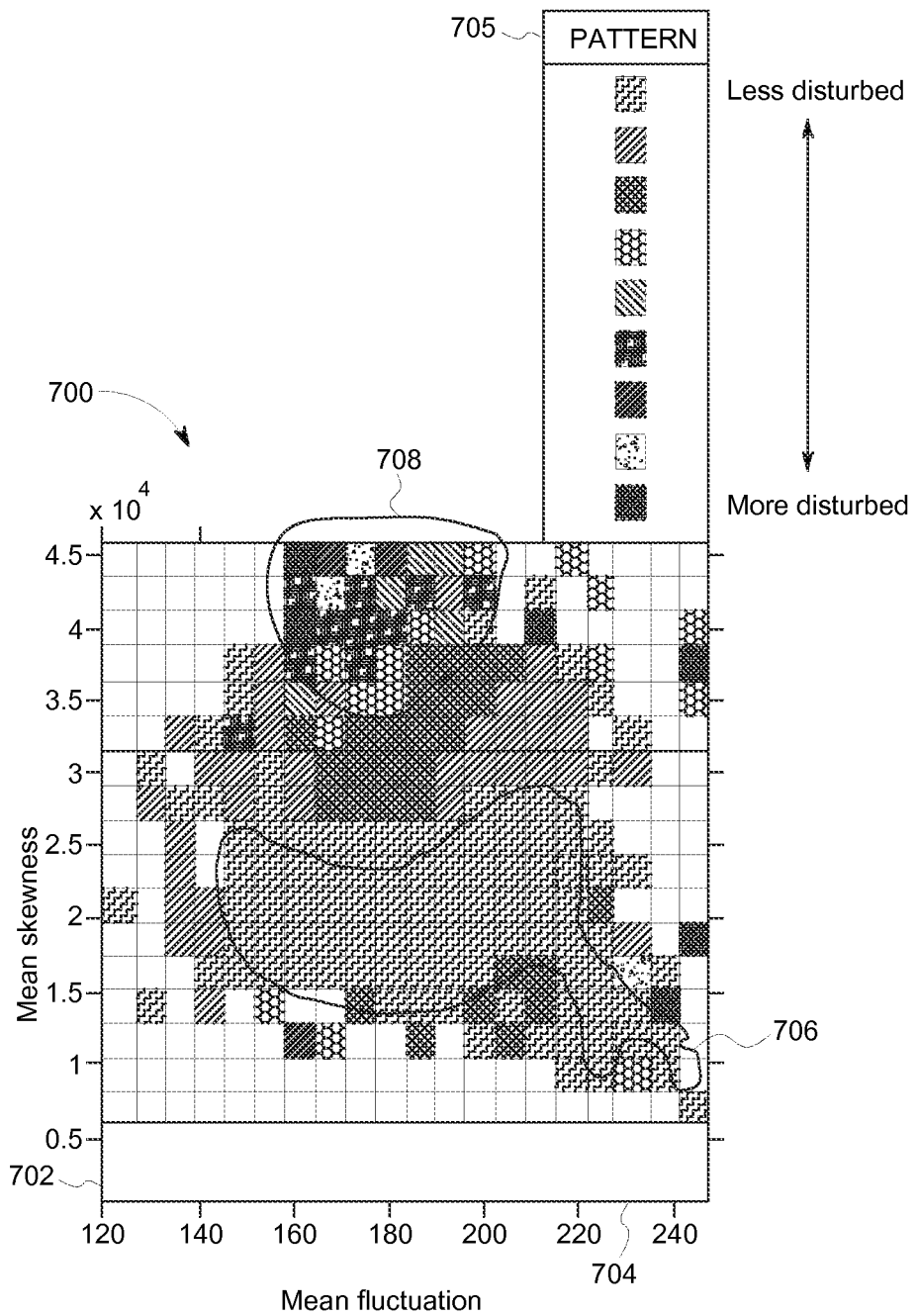
FIG. 9 is an exemplary graphical view of evaluation of noise data as a function of mean skewness and mean fluctuation using an alternative wind turbine park noise monitoring and control system architecture shown in FIG. 5.

FIG. 9 is an exemplary graphical view (graph) 700 of evaluation of noise data as a function of mean skewness (y-axis 702) and mean fluctuation (x-axis 704) using wind turbine park noise monitoring and control system architecture 400 (shown in FIG. 5) with a probabilistic auditory model resident within system 400 other than decision tree model 500 (shown in FIG. 7). Similarly, FIG. 10 is an exemplary graphical view (graph 710) of evaluations of noise data as a function of standard deviations of flux (y-axis 712) and mean fluctuation (x-axis 714) using wind turbine park noise monitoring and control system architecture 400 (shown in FIG. 5) with a probabilistic auditory model resident within system 400 other than decision tree model 500 (shown in FIG. 7).

Alternative embodiments of probabilistic auditory models include, without limitation, a neural network, a support vector regression (SVR) model, or a combination of the two. As used herein, the terms "artificial neural network (ANN)" and "neural network (NN)" are intended to be representative of any computer-implemented programs and computer-based systems that model complex relationships between inputs and outputs or to find patterns in data. Also, as used herein, ANNs and NNs are adaptive systems that change their structure based on external or internal information that flows through the network during a learning phase. In addition, as used herein, the terms "support vector regression (SVR) model" and "support vector machine (SVM)" are intended to be representative of any computer-implemented and computer-based classification methods that construct hyperplanes in multidimensional space to analyze data, recognize patterns, classify and sort such data with similar attributes into one set of defined groups, categorize and sort such data with similar and/or differing attributes into other sets of defined groups, and develop the ability to predict such classification and/or categorization after "training" with training data.

In the exemplary embodiment, y-axis 702 (shown in FIG. 9) for mean skewness extends from approximately $0.5*10^4$ through approximately $4.5*10^4$ in increments of approximately $0.5*10^4$. Y-axis 712 (shown in FIG. 10) for standard deviation of flux ("stdev flux") extends from approximately 0.03 through approximately 0.27 in increments of approximately 0.05. X-axis 704 (shown in FIG. 9) and x-axis 714 (shown in FIG. 10) are substantially similar and extend from approximately 120 to approximately 245 is increments of approximately 20. In some embodiments, given the precise values being sought, a calibration factor is included to convert sound pressure units to Pascals.

Figure 10:
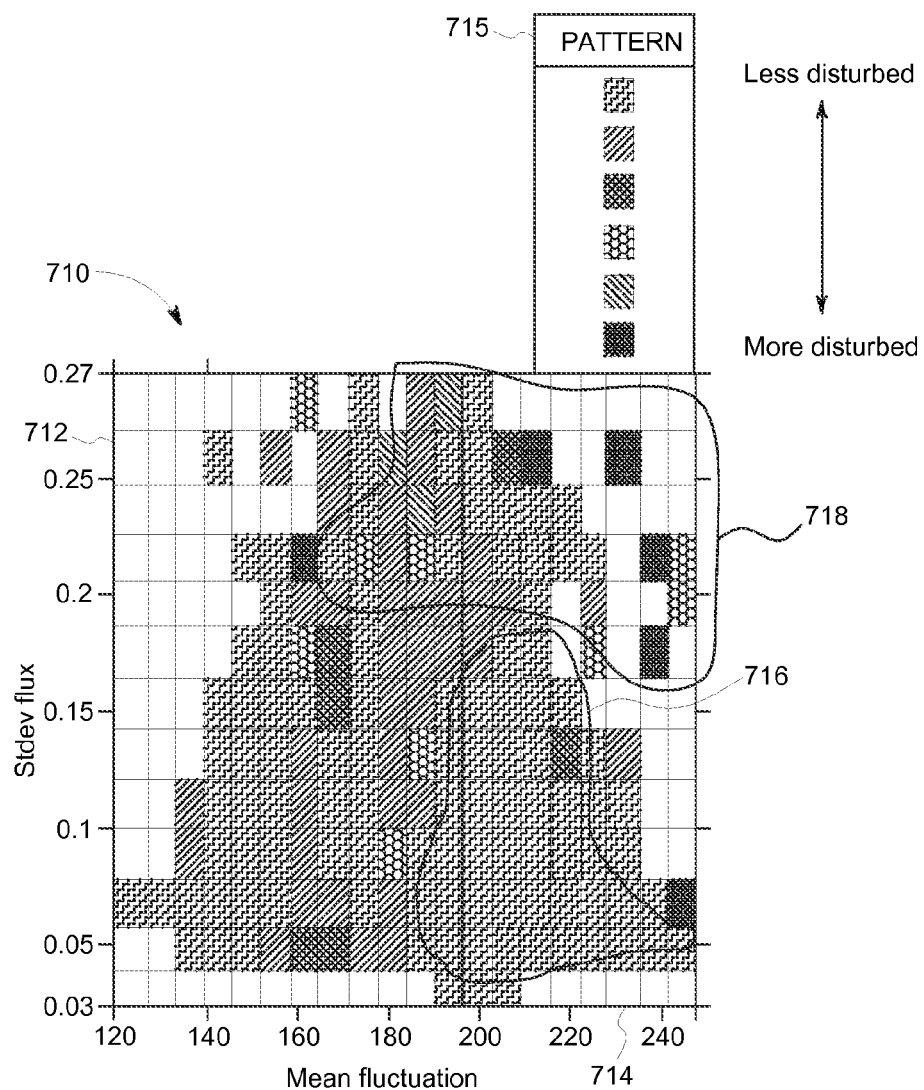
FIG. 10 is an exemplary graphical view of evaluations of noise data as a function of standard deviations of flux and mean fluctuation using an alternative wind turbine park noise monitoring and control system architecture shown in FIG. 5.

Also, in the exemplary embodiment, graphs 700 and 710 define a matrix of rectangles that are either color-coded or pattern-coded (as shown in FIGS. 9 and 10). The colors and patterns indicate a set of rectangles of non-disturbed and disturbed regions where the average overall difference in sound pressures is determined from sound recordings with established auditory models of wind turbine park 300 (shown in FIG. 4) trained into the NN and SVR models. Specifically, FIG. 9 includes a pattern legend 705 and FIG. 10 includes a pattern legend 715 that both illustrate patterns representative of a sliding scale of less disturbed and more disturbed. As the Δ sound pressure values are calculated (estimated), graphs 700 and 710 are shown to exhibit lower Δ sound pressure values ("good") (indicative of non-disturbed sound recordings) and higher Δ sound pressure values ("bad") (indicative of disturbed sound recordings not typically associate with wind turbine noise). The "good" regions are 706 and 716 for FIGS. 9 and 10, respectively, and the "bad" regions are 708 and 718, respectively. The "good" regions 706 and 716 represent the acoustic feature combinations that correspond to relatively low non-turbine noise disturbance, i.e., acceptable regions of the sound/noise recordings. Similarly, the "bad" regions 708 and 718 represent the acoustic feature combinations that correspond to relatively high non-turbine noise disturbance, i.e., unacceptable regions of the sound/noise recordings.

Using such methods facilitates finding and flagging noise segments excessively contaminated by ambient noise. Also, using such methods facilitates correcting measured sound pressure values for the estimated Δ sound pressure values. Further, using such methods facilitates executing a pass/fail filter algorithm for acoustic signals. Moreover, using such methods facilitates using complex interrelations of acoustic features to analyze the sound recordings. In addition, using such methods facilitates continuous statistical estimates of Δ sound pressure values.

Figure 11:
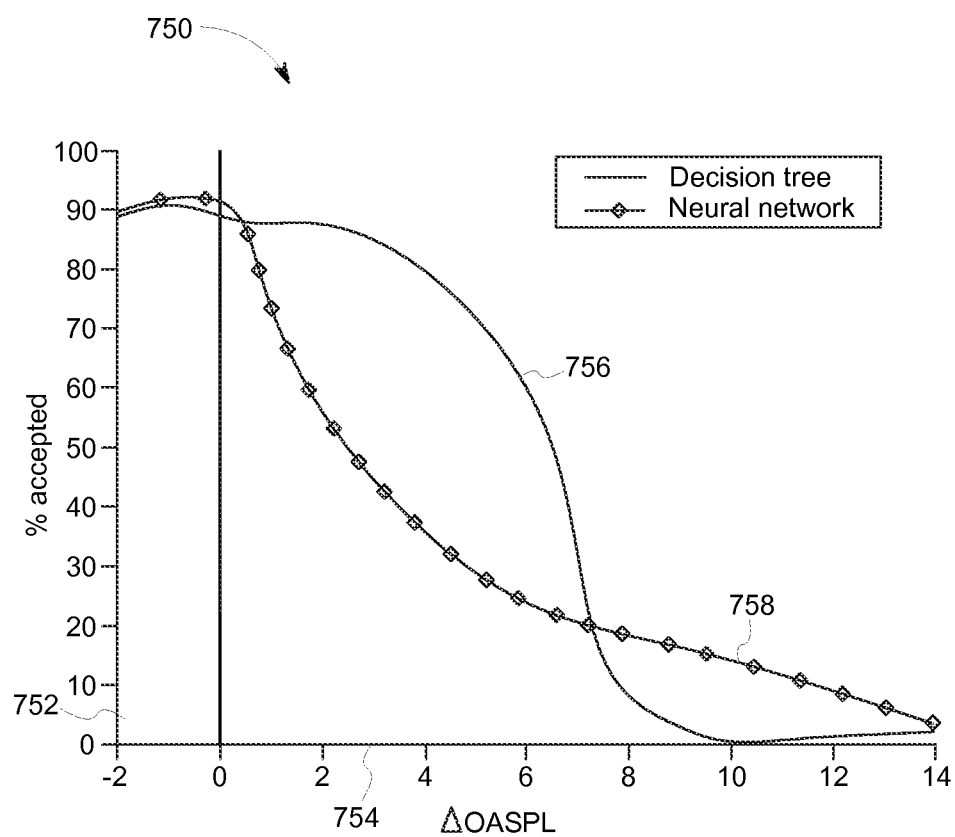
FIG. 11 is an exemplary graphical view of comparisons of different methods of determining acceptable recordings and unacceptable recordings using the wind turbine park noise monitoring and control system architecture shown in FIG. 5.

FIG. 11 is an exemplary graphical view (graph 750) of comparisons of different methods of determining acceptable recordings and unacceptable recordings using wind turbine park noise monitoring and control system architecture 400 (shown in FIG. 5). Graph 750 includes a y-axis 752 representing a percent of accepted sound segments of the total number of recorded sound segments extending from 0% to 100) in increments of 10%. Graph 750 also includes an x-axis 754 representing overall estimated or measured Δ sound pressure values extending from −2 dB to 14 dB in increments of 2 dB. Graph 750 further includes a decision tree curve 756 representative of the percentage of accepted recordings as a function of the determined Δ sound pressure values. Graph 750 also includes a neural network curve 758 representative of the percentage of accepted recordings as a function of the determined Δ sound pressure values. The neural network model is more efficient at flagging recorded sound segments for the determined Δ sound pressure values as the values increase, indicative of disturbed noise segments.

Figure 12:
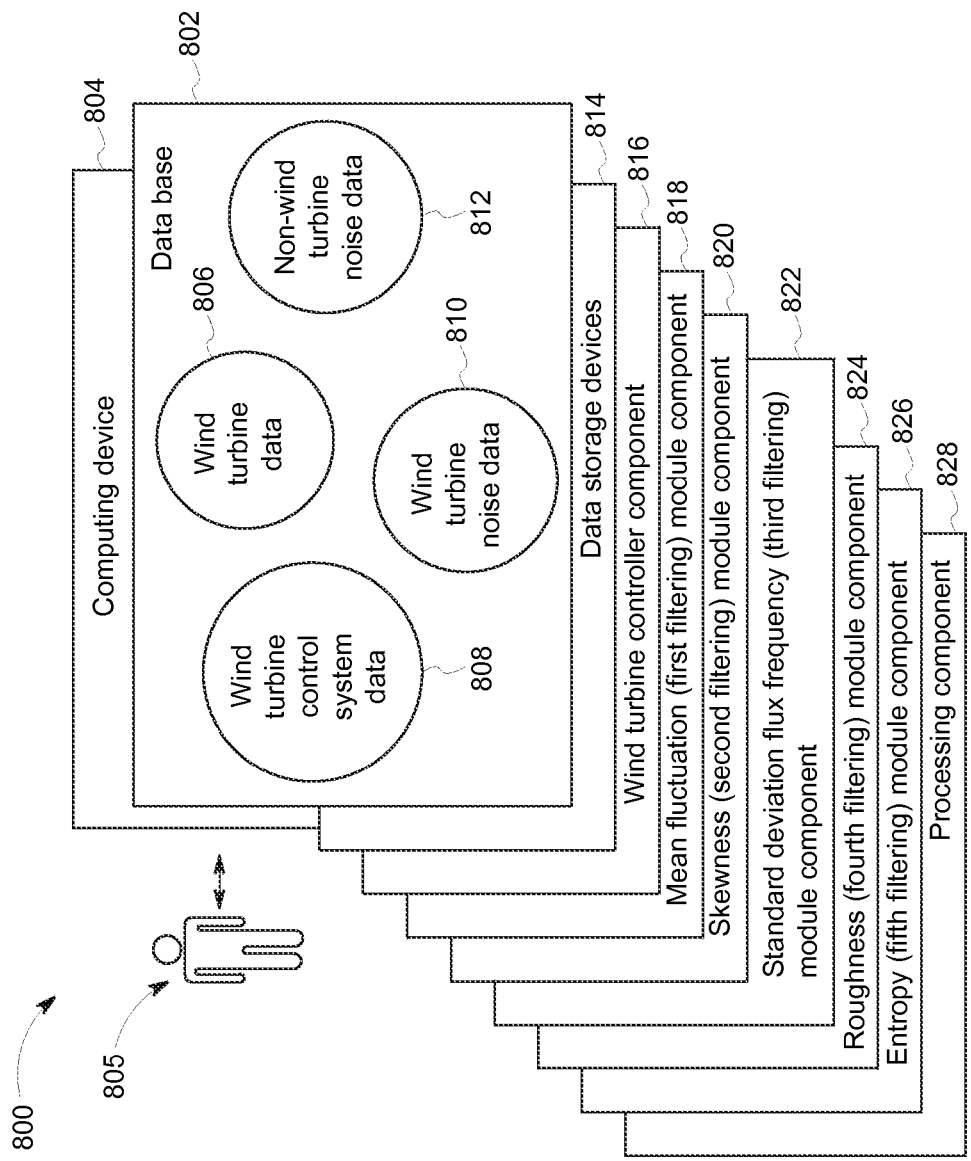
FIG. 12 is an exemplary configuration of a database within the computing device shown in FIG. 1, along with other related computing components, that may be used to determine acceptable recordings and unacceptable recordings as described herein.

FIG. 12 is an exemplary configuration 800 of a database 802 within a computing device 804, along with other related computing components, which may be used to operate wind turbine park 300 (shown in FIG. 4) as described herein. Database 802 is coupled to several separate components within computing device 804, which perform specific tasks. In the exemplary embodiment, computing device 804 may be computing device 105 (shown in FIG. 1) or CPU 215 (shown in FIG. 2). Computing device 804 is configured to interface with a human system operator 805.

In the exemplary embodiment, database 802 includes wind turbine data 806, wind turbine control system data 808, wind turbine noise data 810, and non-wind turbine noise data 812. Wind turbine data 806 includes information such as configuration data, e.g., and without limitation, the number of wind turbine blades and the speed of rotation. Wind turbine control system data 808 includes information associated with the architecture of wind turbine control system 200, such as, without limitation, wind turbine park noise monitoring and control system 400. Wind turbine noise data 810 includes that data associated with the first contribution to the wind park noise associated with at least one operating wind turbine 301 and non-wind turbine noise data 812 includes data associated with the second contribution to the wind park noise associated with non-wind turbine sources as described herein.

Computing device 804 includes database 802, as well as data storage devices 814. Computing device 804 also includes a wind turbine controller component 816 for executing method steps 602 through 616 (shown in FIG. 8). Computing device 804 further includes a mean fluctuation (first filtering) module component 818, a skewness (second filtering) module component 820, a standard deviation flux (third filtering) module component 822, a roughness (fourth filtering) module component 824, and an entropy (fifth filtering) module component 826, all configured to execute method steps 606 through 616. Computing device 804 further includes a processing component 828 that assists with execution of computer-executable instructions associated with wind turbine park noise monitoring and control system 400, method 600, and configuration 800 as described herein. In addition, any statistical analyses of any acoustic features that enable operation of system 400, method 600, and configuration 800 as described herein are used including, without limitation, kurtosis, zero crossing rate, cepstrum (inverse Fourier transform of logarithmic spectrum), mel-frequency cepstral coefficients (MFCCs), and brightness.

The above-described wind turbine park control system provides for using acoustic features of measured sound pressures of a wind turbine park to facilitate discriminating between noise emanating from wind turbines and noise emanating from other sources. Specifically, the systems and methods described herein use historical data to construct a probabilistic model for discriminating between wind turbine noise and non-wind turbine noise. The historical data includes segments of sound recordings of varying lengths that include the recorded sound pressures as a function of time. Some of the sound segments will include sound pressures that are substantially mostly wind turbine-generated noise, with only some small ambient non-wind turbine noise contamination, i.e., such sound segments are substantially uncontaminated, or non-disturbed. Alternatively, some of the sound segments will include sound pressures that include a significant level of ambient non-wind turbine noise contamination and are therefore substantially contaminated, or disturbed. As such, the systems and methods described herein are configured to facilitate enhanced discrimination between wind turbine noise and non-wind turbine noise through a constructed probabilistic model relating such noise feature changes to sound pressure. Such changes in sound pressure measurements may be changes to the overall noise level and shifts in the partial contributions between wind turbine noise and non-wind turbine noise while the changes in the overall noise level may be relatively constant. Therefore, the systems and methods described herein are configured to facilitate classification of the measured sound pressures contaminated and non-contaminated sound segments. More specifically, the systems and methods described herein are configured to model acoustic features associated with the wind turbine park and use the model to classify sound/noise recordings generated from measured sound pressures into non-contaminated and contaminated sound segments.

Moreover, the wind turbine park control system described herein facilitates enhanced feedback control of the wind turbines in the wind turbine park. Specifically, the embodiments described herein facilitate enhanced control of the noise reduced operation (NRO) mode through determinations of real-time, day-to-day, and seasonal changes in acoustic features in addition to the standard environmental features, e.g., wind speed, wind direction, and air density. As such, the embodiments described herein facilitate enhancing power generation performance and increasing annual energy production (AEP) by taking into account time-dependent variables such as wind turbine configuration changes including turbine outages and blade contamination and erosion. In addition, enhanced discrimination between disturbed and non-disturbed sound pressures facilitates using smaller margins to regulatory parameters, thereby further enhancing power generation. Also, power generation from wind turbine parks is enhanced through increasing the population density of the wind turbines in space-constrained sites.

An exemplary technical effect of the methods, systems, and apparatus described herein includes at least one of: (a) correcting measured sound pressures at a wind turbine park based on model correlations based on probabilistic assessments of long-term and short-term non-wind turbine noise contamination; (b) enhanced control of the noise reduced operation (NRO) mode through determinations of real-time, day-to-day, and seasonal changes in acoustic features in addition to the standard environmental features; (c) enhancing power generation performance and increasing annual energy production (AEP) by taking into account time-dependent variables such as wind turbine configuration changes including turbine outages and blade contamination and erosion; (d) enhancing discrimination between contaminated and non-contaminated sound segments, thereby facilitating use of smaller margins to regulatory parameters, thereby further enhancing power generation; (e) enhancing discrimination between wind turbine noise and non-wind turbine noise through a constructed probabilistic model relating such noise feature changes to sound pressure; and (f) classifying measured sound pressures into contaminated and non-contaminated sound segments.

Exemplary embodiments of methods, systems, and apparatus for operating wind turbine parks are not limited to the specific embodiments described herein, but rather, components of systems and/or steps of the methods may be utilized independently and separately from other components and/or steps described herein. For example, the methods may also be used in combination with other systems requiring real-time regulation based on real-time environmental acoustic conditions as well as correlated historical acoustic features with historical park conditions and the associated methods, and are not limited to practice with only the systems and methods as described herein. Rather, the exemplary embodiment can be implemented and utilized in connection with many other applications, equipment, and systems that may benefit from such acoustic monitoring and regulation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method of operating a wind turbine park using a computing device including at least one processor coupled to a memory device, the wind turbine park including at least one operating wind turbine, said method comprising:
    recording a plurality of sound pressure measurements of the wind turbine park;
    using the plurality of sound pressure measurements for generating a sound recording;
    calculating values for a plurality of acoustic features associated with the sound recording;
    determining a relationship between the calculated values for the plurality of acoustic features and modeled acoustic features values resident within a probabilistic auditory model of the wind turbine park; and
    distinguishing a first contribution to the sound recording originating from the at least one operating wind turbine from a second contribution to the sound recording originating from non-wind turbine sources based on the determined relationship.

2. The method in accordance with claim 1 further comprising generating the probabilistic auditory model of the wind turbine park including a first contribution associated with the at least one operating wind turbine and a second contribution associated with non-wind turbine sources.

3. The method in accordance with claim 1, wherein calculating values for a plurality of acoustic features comprises executing a plurality of statistical and non-statistical algorithms over at least a portion of a predetermined frequency range.

4. The method in accordance with claim 3 further comprising generating a sound pressure measurement versus time relationship of the plurality of sound pressure measurements.

5. The method in accordance with claim 4, wherein the sound pressure measurement versus time relationship includes amplitude modulated waveforms having a carrier frequency component and a modulation envelope component, wherein executing a plurality of statistical and non-statistical algorithms comprises analyzing at least one of the carrier frequency component and the modulation envelope component.

6. The method in accordance with claim 1, wherein distinguishing a first contribution to the sound recording comprises filtering the second contribution to the sound recording originating from non-wind turbine sources from the sound recording of the wind turbine park.

7. The method in accordance with claim 6, wherein filtering the second contribution to the sound recording comprises flagging portions of the sound recording.

8. The method in accordance with claim 1, wherein distinguishing a first contribution to the sound recording comprises distinguishing the second contribution to the sound recording originating from non-wind turbine sources for a plurality of temporal periods.

9. The method in accordance with claim 8, wherein distinguishing the second contribution to the sound recording originating from non-wind turbine sources comprises analyzing the second contribution to the sound recording for a predetermined temporal period after generating the sound recording.

10. The method in accordance with claim 8, wherein distinguishing the second contribution to the sound recording originating from non-wind turbine sources comprises:
calculating contributions of the second contribution to the sound recording to differences in total sound pressure measurements (A sound pressures); and
generating statistical estimates of the A sound pressures.

11. The method in accordance with claim 8, wherein distinguishing the second contribution to the sound recording originating from non-wind turbine sources comprises using known sources of the second contribution to the sound recording to train the probabilistic auditory model of the wind turbine park.

12. The method in accordance with claim 8, wherein distinguishing the second contribution to the sound recording originating from non-wind turbine sources comprises relating changes in the calculated values for the plurality of acoustic features to acoustic signatures associated with known noise sources resident within the probabilistic auditory model of the wind turbine park.

13. A wind turbine park comprising:
a plurality of wind turbines comprising an operating wind turbine;
a microphone positioned proximate said wind turbine park; and
a computing device coupled to said microphone, said computing device comprising a processor and a memory device coupled to said processor, said computing device configured to:
record a plurality of sound pressure measurements of said wind turbine park through said microphone;
use the plurality of sound pressure measurements to generate a sound recording;
calculate values for a plurality of acoustic features associated with the sound recording;
determine, using the computing device, a relationship between the calculated values for the plurality of acoustic features with modeled acoustic features values resident within a probabilistic auditory model of said wind turbine park; and
distinguish a first contribution to the sound recording originating from said operating wind turbine from a second contribution to the sound recording originating from non-wind turbine sources based on the determined relationship.

14. The wind turbine park in accordance with claim 13, wherein said microphone comprises a microphone station comprising at least a portion of said computing device.

15. The wind turbine park in accordance with claim 13, wherein said microphone comprises a plurality of microphones positioned at least one of within a perimeter, on the perimeter, and outside of the perimeter of said wind turbine park.

16. The wind turbine park in accordance with claim 13, wherein said microphone is aligned with respect to said operating wind turbine, thereby facilitating Doppler-shift analysis of at least a portion of the sound recording.

17. The wind turbine park in accordance with claim 13, wherein said microphone is wireless and configured for one of one-directional communication and bi-directional communication.

18. The wind turbine park in accordance with claim 13, wherein said computing device comprises a noise monitoring and control station configured to regulate operation of said operating wind turbine at least partially based on the determined relationship.

19. The wind turbine park in accordance with claim 13, said computing device is further configured to generate the probabilistic auditory model of said wind turbine park including a first contribution associated with said operating wind turbine and a second contribution associated with non-wind turbine sources.

20. A non-transitory computer readable medium having computer-executable instructions embodied thereon, wherein when executed by at least one processor, the computer-executable instructions cause the at least one processor to:
record a plurality of sound pressure measurements of a wind turbine park;
use the plurality of sound pressure measurements to generate a sound recording;
calculate values for a plurality of acoustic features associated with the sound recording;
determine a relationship between the calculated values for the plurality of acoustic features with modeled acoustic features values resident within a probabilistic auditory model of the wind turbine park; and
distinguish a first contribution to the sound recording originating from an operating wind turbine from a second contribution to the sound recording originating from non-wind turbine sources based on the determined relationship.

* * * * *